United States Patent
Horiguchi et al.

(10) Patent No.: US 7,119,662 B1
(45) Date of Patent: Oct. 10, 2006

(54) SERVICE SYSTEM, INFORMATION PROCESSING SYSTEM AND INTERROGATOR

(75) Inventors: Akiko Horiguchi, Hachioji (JP); Mitsuo Usami, Akishima (JP); Masaru Ohki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 940 days.

(21) Appl. No.: 09/666,862

(22) Filed: Sep. 21, 2000

Related U.S. Application Data

(63) Continuation-in-part of application No. 09/645,401, filed on Aug. 25, 2000, now Pat. No. 7,051,205.

(30) Foreign Application Priority Data

Jun. 15, 2000 (JP) ........................................ 2000-180044

(51) Int. Cl.
- B60R 25/00 (2006.01)
- G05B 19/00 (2006.01)
- G06F 7/00 (2006.01)
- G08B 29/00 (2006.01)
- H04B 1/00 (2006.01)

(52) U.S. Cl. ...................... 340/5.7; 340/5.61; 340/5.71; 340/5.72; 340/5.73; 340/5.74; 340/5.8

(58) Field of Classification Search .................. 340/5.7, 340/5.61, 5.71, 5.72, 5.73, 5.74, 5.8, 5.6, 340/5.62, 5.64, 5.57, 5.85, 5.86, 5.91, 5.92, 340/10.1, 10.3, 10.42

See application file for complete search history.

(56) References Cited

U.S. PATENT DOCUMENTS

| | | | |
|---|---|---|---|
| 4,825,052 A | | 4/1989 | Chemin et al. |
| 5,008,661 A | * | 4/1991 | Raj .......................... 340/10.51 |
| 5,109,152 A | | 4/1992 | Takagi et al. |
| 5,288,978 A | * | 2/1994 | Iijima .......................... 235/380 |
| 5,355,413 A | | 10/1994 | Ohno |
| 5,430,441 A | * | 7/1995 | Bickley et al. ............. 340/10.2 |
| 5,444,222 A | | 8/1995 | Inoue |
| 5,457,747 A | | 10/1995 | Drexler et al. |
| 5,565,858 A | * | 10/1996 | Guthrie .................... 340/10.33 |
| 5,677,955 A | | 10/1997 | Doggett et al. |
| 5,721,781 A | | 2/1998 | Deo et al. |
| 5,781,723 A | | 7/1998 | Yee et al. |
| 5,841,866 A | | 11/1998 | Bruwer et al. |
| 5,862,247 A | * | 1/1999 | Fisun et al. .................. 382/116 |

(Continued)

FOREIGN PATENT DOCUMENTS

| | | |
|---|---|---|
| EP | 1 148 440 | 12/1999 |
| JP | 06-297887 | 10/1994 |
| JP | 10-247229 | 9/1998 |
| JP | 11-277963 | 10/1999 |

*Primary Examiner*—Michael Horabik
*Assistant Examiner*—Nam Nguyen
(74) *Attorney, Agent, or Firm*—Mattingly, Stanger, Malur & Brundidge, P.C.

(57) ABSTRACT

A contactless IC chip is mounted or adhered on a certificate and used in a service system having an interrogator and a computer system. The interrogator and the computer system are interconnected via a network such as the Internet. The IC chip is used as an electronic tag and the interrogator receives first information by reading information printed on the certificate including a digital signature and by receiving second information from the electronic tag through an antenna of the interrogator. Then, the first information from the certificate and the digital signature are used by the computer to calculate third information that is compared with the second information received from the electronic tag. If the comparison results in a match, then the certificate is deemed authentic.

12 Claims, 47 Drawing Sheets

U.S. PATENT DOCUMENTS

| | | |
|---|---|---|
| 5,878,138 A | 3/1999 | Yacobi |
| 5,959,276 A | 9/1999 | Iijima |
| 5,974,150 A | 10/1999 | Kaish et al. |
| 6,029,887 A * | 2/2000 | Furuhashi et al. .......... 235/379 |
| 6,147,860 A | 11/2000 | Iwasaki |
| 6,147,861 A | 11/2000 | Iwasaki |
| 6,175,626 B1 | 1/2001 | Aucsmith et al. |
| 6,232,870 B1 * | 5/2001 | Garber et al. ............... 340/10.1 |
| 6,255,951 B1 * | 7/2001 | De La Huerga ......... 340/573.1 |
| 6,338,138 B1 | 1/2002 | Raduchel et al. |
| 6,385,318 B1 * | 5/2002 | Oishi ........................ 380/262 |
| 6,390,377 B1 | 5/2002 | Dlugos |
| 6,549,912 B1 * | 4/2003 | Chen ...................... 707/104.1 |
| 6,567,915 B1 * | 5/2003 | Guthery ...................... 713/168 |
| 6,598,087 B1 | 7/2003 | Dixon et al. |
| 6,659,353 B1 | 12/2003 | Okamoto et al. |
| 6,741,972 B1 | 5/2004 | Girardi et al. |
| 6,760,843 B1 | 7/2004 | Carter |

\* cited by examiner

Figure 35

| IC chip number | User information | Information to check soundness | Content of service | Status of use | Term of validity |
|---|---|---|---|---|---|
|  |  |  |  |  |  |
|  |  |  |  |  |  |
|  |  |  |  |  |  |

Figure 42

Service facility A

| IC chip number | User information | Information to check soundness | Content of service | Status of use | Term of validity |
|---|---|---|---|---|---|
| | | | | | |
| | | | | | |
| | | | | | |

Service facility B

| IC chip number | User information | Information to check soundness | Content of service | Status of use | Term of validity |
|---|---|---|---|---|---|
| | | | | | |
| | | | | | |
| | | | | | |

SERVICE SYSTEM, INFORMATION PROCESSING SYSTEM AND INTERROGATOR

The present application is a Continuation-In-Part of U.S. patent application Ser. No. 09/645,401, filed on Aug. 25, 2000 now U.S. Pat. No. 7,051,205.

BACKGROUND OF THE INVENTION

The present invention relates to a service system, an information processing system and an interrogator using a contactless IC chip.

In a service system such as health insurance, automobile physical damage insurance and travel insurance, a user has been certified his eligibility for the membership of the service by presenting a paper certificate. A subscriber of health insurance can obtain the health insurance service (i.e., medical service) by possessing a health insurance certificate. A paper money (bill) or a merchandise coupon is considered as a kind of certificate which has a monetary value for exchanging with a product or service. Thus, hitherto, certificates for which countermeasures against counterfeiting using printing technology are provided have been used for obtaining various types of services.

A facility of service which manages the overall service system have executed a certificate-based management of the service system. After receiving some compensation from a user, the facility of service gives a certificate which certifies the right of use of the service to the user. The user then presents or transfers the certificate to a facility to execute service which actually executes the service to thereby obtain the service. In some cases, the facility of service and the facility to execute service are same as each other, and in the other cases, they are different from each other. One example of the service in which the facility of service and the facility to execute service are same is a transportation system using a passenger ticket. A railway company or the like issues a certificate such as a passenger ticket or a commuter pass to a user and provides the transportation service only to a user who carries the certificate. One example of the service in which the facility of service and the facility to execute service are different is a health insurance, in which the facility of service is a health insurance society and the facility to execute service is a medical institution.

On the other hand, Japanese Patent Application Laid-open No. 11-277963 discloses a method for attaching a contactless IC chip onto an admission ticket and writing data which is identical as the data printed on the ticket to the IC chip.

SUMMARY OF THE INVENTION

Conventional certificates have some problems. For example, since some of the certificates are about the size of a palm of a human, they are inconvenient to carry and therefore usually kept in a home. In this case, a user may come upon a situation in which the user cannot obtain the service for the reason that the user has left the certificate behind. To solve this problem, in addition to an original certificate, a card-type of certificate made of paper or plastic is often issued. However, the genuineness of the card-type of certificate is protected only by printing technology, and therefore there is a possibility of counterfeiting thereof. To prevent the fraud use of the counterfeited certificate, it is needed that a facility of service verify the identity of the owner of the certificate by another method, which may lead the increase in management costs of the service system. Moreover, even for a card-type certificate, when a user intends to obtain many kinds of services, the number of the certificates becomes large and it is inconvenient to bring these certificates.

Likewise, an original certificates also have a problem that a counterfeited one may be used fraudulently. With respect to a paper money, a merchandise coupon or a stock certificate, which is a kind of certificate certifying a monetary value, there have been reported cases where counterfeiting is performed using a copying machine or a high-precision printer.

An object of the present invention is to provide a sheet-shaped medium which can be used as a certificate or a part of a certificate and which is hard to counterfeit. Another object of the present invention is to provide a method and an apparatus for the determination of genuineness or counterfeitness of the sheet-shaped medium, a method for the determination of the soundness of the sheet-shaped medium and a method for the verification of data of the sheet-shaped medium. Still another object of the present invention is to provide an apparatus for issuing a certificate which is hard to counterfeit. Further still another object of the present invention is to provide a novel service system in which verification of a certificate can be performed online.

In an embodiment of the present invention, a contactless IC chip is used in which information about a facility of service which executes a service, personal information of a user of the service, information which uniquely identifies every individual IC chip, or any combination of these pieces of information is stored. The IC chip may be placed on a sheet-shaped medium for use as a certificate, or a sheet-shaped medium having the IC chip may be placed on another medium (e.g., a paper sheet, a plastic card) on which a proof item or items are printed for use as a certificate.

The certificate according to the embodiment of the present invention can be determined for its soundness by verifying the information printed on the surface of the certificate against the information read from the memory of the IC chip. The certificate may employ a configuration that enables to combine the information printed on the surface of the certificate with the information stored in the memory of the IC chip using a cryptography technique, whereby the counterfeiting of the certificate becomes much more difficult. Alternatively, a system may be employed in which a facility (e.g., an information center) is intervened to send the information read from the memory of the IC chip attached to the certificate to the facility and to certify the soundness of the certificate online.

The service system according to an embodiment of the present invention is a system in which a facility of service which manages a service distributes a certificate which certifies the right of use of the service to a user and, upon the certificate being presented by the user, the facility of service or a agency thereof provides the service to the user. The system is characterized in that a certificate on which a sheet-shaped medium having an IC chip integrated therein is used and that a facility to execute service reads at least the information of the IC chip in the sheet-shaped medium in a contactless manner to provide the service to the user who presents the certificate. In place of the certificate on which the sheet-shaped medium is attached, a sheet-shaped medium into which an IC chip is put may be used as a certificate. The IC chip-attached sheet-shaped medium may be distributed using a post card. In the facility to execute service which provides a service, the soundness of an IC chip-attached sheet-shaped medium or an IC chip-attached certificate is determined using the information stored in the IC chip attached to the sheet-shaped medium and the information printed on the surface of the IC chip-attached sheet-shaped medium or certificate, and the service is provided when the soundness is certified. Alternatively, a service may be provided after information about right of use stored in the IC chip is inquired to a center to certify information about right of use which is associated with the facility of service to confirm the soundness of the information.

The applications of the sheet-shaped medium according to the present invention include the following, for example.

(1) Application in medical institutions:
(a) Management of information about clinical tests; and
(b) Management of drug administrations and clinical tests;
(2) Application intended for home use:
(a) Transfer and sending of money to a bank account; and
(b) Reservation of tickets and so on;
(3) Applications intended for corporate use:
(a) ID cards of company stuffs;
(b) Management of going in/out of rooms;
(c) Management of the use of council rooms; and
(d) Management of entrance/exit of parking space;
(4) Application intended for store use:
(a) Settlement of accounts; and
(b) Issue of point(s) to customers according to the amounts paid for purchases;
(5) Application intended for use in banking systems:
(a) Credit cards; and
(b) Prepaid cards (e.g., phonecards, passenger payment cards for trains or buses);
(6) Application in physical distribution:
(a) Electronic sales slips; and
(b) Electronic tags;
(7) Application in traffic systems:
(a) Commuter passes;
(b) Passenger tickets (including tickets for limited expresses and reserved-seat tickets);
(c) Boarding cards; and
(d) Reservation tickets (e.g., hotel vouchers, concert tickets);
(8) Application in public institutions:
(a) Health insurance certificates;
(b) Resident cards;
(c) Passports;
(d) Other license cards (e.g., driver's license cards, admission tickets); and
(9) Gift certificates.

As used herein, the term "sheet-shaped medium" refers to a thin object made of, for example, paper or plastic. Typical examples of the sheet-shaped medium include a merchandise coupon and a paper money. In the present invention, the medium is not necessarily a sheet-shaped one, and may not have a shape of a thin plate or film, or may have a bulky shape with a thickness that cannot be categorized as "a plate". Regardless of whether or not the medium has a sheet-like shape, the medium may have an even or uneven thickness. The shape of the top view of the medium may be square or any other shape.

It is convenient for a user to keep an IC chip-attached seal or seals (i.e., sheet-shaped medium) in the form that the seal or seals are attached or stuck on a mount on which a groove or grooves each having a predetermined size are formed at regular wide intervals. On the seals, a counterfeiting-preventing print may be applied. Preferably, an IC chip-attached seal or certificate is kept in a card case (e.g., a commuter pass case) covered with a metal film that can shield electromagnetic waves, for safety reasons. The IC chip may be placed on an adhesive sheet which can be adhered to another object when a backing sheet is taken off.

When a plurality of IC chips are mounted on a tape having a backing sheet at regular wide intervals, IC chip tags can be produced readily by cutting the tape at appropriate sites between the IC chips. When a plurality of IC chips each of which is connected to external antennas are mounted on a tape having a backing sheet at regular wide intervals, IC chip tags each connected to the external antennas can be produced readily simply by cutting the tape at appropriate sites between the IC chips. In the both cases, a counterfeiting-preventing print may be applied on the tape. The mounting of an IC chip-attached tape may be performed by placing two external antennas on a tape in the direction parallel to the lengthwise direction of the tape with leaving a space which is almost the same as one formed between the pads of the IC chip, and placing IC chips at regular wide intervals between the external antennas to connect each of the pads of the IC chip to the external antennas. Alternatively, conductive microparticles which have a conductivity when adhered tightly to an object may be used to connect the IC chip to the external antennas. For this purpose, the microparticles are printed tightly between the IC chip and each of the external antennas.

In the embodiments of the present invention, a contactless IC chip is used as a potable means for the certification. A certificate manufactured using printing technology may have a possibility of counterfeiting by using a high-performance printing machine or highly precise printing apparatus. In contrast, an IC chip cannot be manufactured without a factory equipped with a semiconductor-manufacturing facility, and therefore is difficult to counterfeit compared with a certificate manufactured using printing technology. When information to be used for the certification is stored in an IC chip, the information can be protected by means of the structural properties of the semiconductor itself or by using cryptographic technology and it becomes extremely difficult to falsify the information. Since an IC chip is very small in size, the IC chip becomes easy to carry by attaching it on a seal and sticking the IC chip-attached seal on a mount and it becomes more convenient on the user's part. When providing a service, a facility to execute service certifies information in the IC chip to enable to verify and provide the information of the certificate with high reliability.

Since a seal (i.e., a sheet-shaped medium) having an IC chip, i.e., an IC chip-attached seal, is thin and small, it can be distributed to a user readily. The IC chip-attached seal may be distributed in the form attached on a certificate or by mail using a post card. When the IC chip-attached seal is distributed to a user directly by mail using a post card, the distribution can be achieved at lower cost compared to a conventional method. In addition, when an IC chip is put or integrated into a certificate or a tape having an IC chip is attached to on a certificate, it becomes more difficult to counterfeit the certificate. This is because the counterfeiting of an IC chip itself is difficult compared with a certificate manufactured using printing technology, as mentioned above.

The interrogator (i.e., a reader/writer) for an IC chip (hereinafter, simply referred to as an "IC chip-interrogator") may be endowed with a function to read a character, whereby it becomes possible to read more readily information such as information of an IC chip on an IC chip-attached and proof items printed on the certificate. A simplified certificate-issuing system may be used to issue an IC chip-attached certificate readily, whereby the convenience on the user's part is improved. When a function as an IC chip-interrogator is endowed to a mobile telephone, the mobile telephone can also be used as an IC chip-interrogator, whereby the manufacture cost of the IC chip-interrogator can be reduced. In this case, it becomes also possible to transfer the information read from the IC chip to a facility of service or the like via a mobile telephone easily.

According to the embodiments of the present invention, since a small IC chip-attached seal can be used as a certificate, the portability of a certificate can be improved. When an IC chip-attached seal or certificate is used, counterfeiting of the certificate becomes more difficult, and therefore the reliability of a service system executed by a facility of service or a facility to execute service can be improved.

This specification includes part or all of the contents as disclosed in the specification and/or drawings of Japanese Patent Application No. 2000-180044, which is a priority document of the present application.

The above and other objects, effects, features and advantages of the present invention will become more apparent from the following description of embodiments thereof taken in conjunction with the accompanying drawings.

BRIEF DESCRIPTION OF THE DRAWINGS

FIG. 35 shows an example of a database on the information about right of use, which is stored and managed by a center to certify information about right of use.

FIG. 42 shows an example of a database on information about right of use, of which storage and management are performed by an agency for service center.

DETAILED DESCRIPTION OF THE INVENTION

Hereinbelow, embodiments of the present invention will be described more in detail with reference to the drawings attached.

Figure 1:
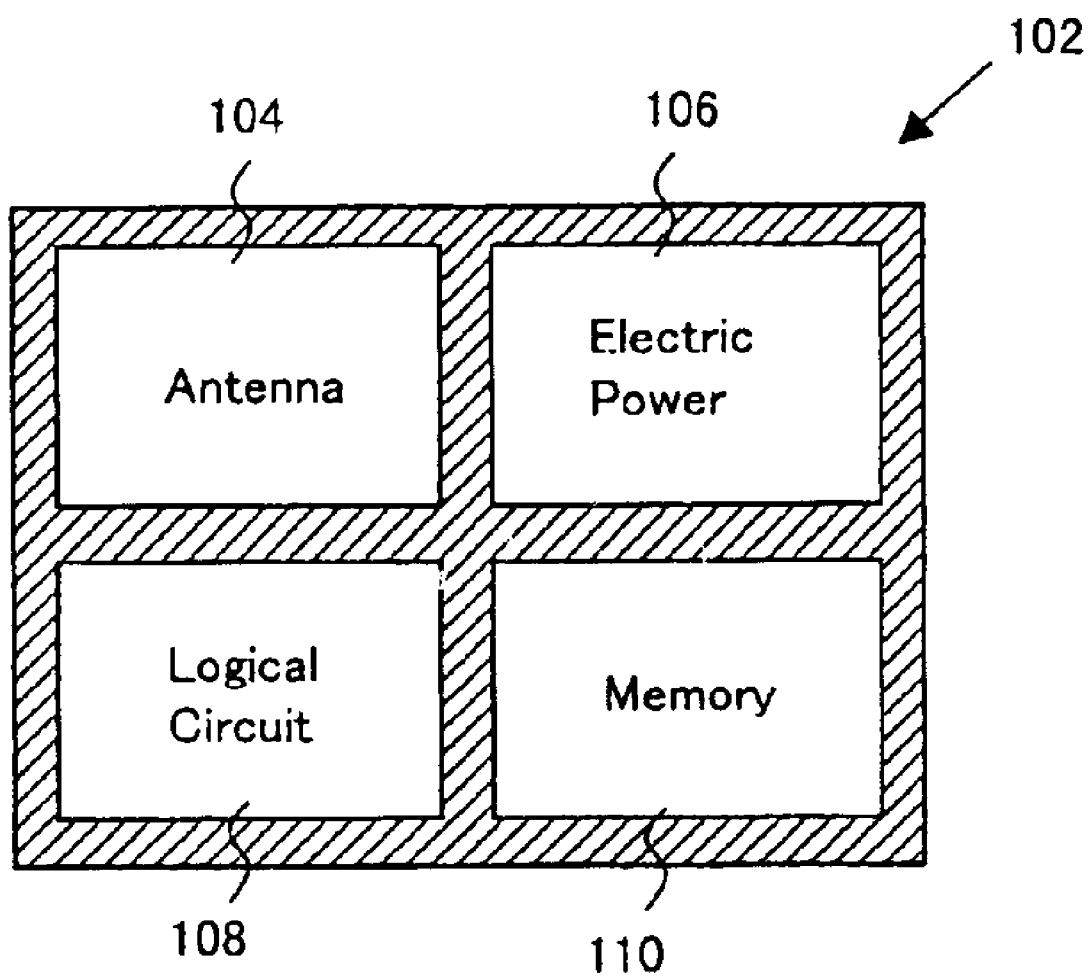
FIG. 1 is a schematic illustration of a contactless IC chip.

FIG. 1 is a schematic illustration of a contactless IC chip according to the present invention. The IC chip 102 comprises an antenna 104, an electric power 106, a logical circuit 108 and a memory 110. A contactless IC chip has no exposed electrode, and performs supply of electric power and sending/receiving of clock and data by delivering radio waves from a interrogator (not shown) to the antenna provided in the contactless IC chip. The antenna 104 includes two types: one integrated in an IC chip; and one provided to an IC chip externally. The IC chip shown in FIG. 1 is an embodiment in which the antenna is provided internally. In an IC chip having an external antenna, the antenna is provided to the IC chip externally. In the embodiment, an IC chip of any mode may be used, regardless of whether or not the antenna is provided externally or internally. The mode for sending/receiving information between the interrogator and the antenna in a contactless manner includes several types, such as an electromagnetic induction type. In the embodiment, an IC chip having any type of sending/receiving mode may be used.

Next, the function of the IC chip 102 will be described. In the IC chip 102, the antenna 104 receives radio waves, and the electric power 106 generates electric power which is needed for the entire circuitry of the IC chip. From the radio waves received by the antenna 104, a clock component is extracted, which is used as the clock for the entire circuitry of the IC chip. The logical circuit 108 performs a processing in accordance with a command sent from the interrogator. The memory 110 is an area in which information to be contained in the IC chip is stored. The IC chip 102 may include various types, such as a non-rewritable type which has only a ROM as the memory and a rewritable type which has an electrically rewritable memory (e.g., EEPROM). An IC chip of either of these types may be applicable in the embodiment of the present invention.

In the embodiment of the present invention, an IC chip in which information about a facility of service which manages a service to be provided to a user is stored in a memory, an IC chip in which information about the user is stored, an IC chip in which a numerical number unique to every individual IC chip is stored in a memory, or an IC chip in which any combination of these pieces of information is stored in a memory, may be used.

It is preferable to manufacture the IC chip in a small size. From this viewpoint, as an IC chip to be issued by a facility of service, one in which information indicating that the IC chip is issued by the facility of service is stored may be used. In the IC chips of this type, the same information is stored in every IC chip issued by the same facility of service. Although the IC chip of this type has a disadvantage that any personal information about a user is not stored, it has an advantage that falsification of the information stored therein at a later time can be prevented because the information is written in the IC chip using a ROM. The IC chip of this type has an additional advantages that the size of the chip can be reduced because the information is written using only a ROM. An IC chip in which personal information about a user is not stored and information about the facility of service is stored can be used for a service system for which a certificate or the like having the IC chip attached therein is independent on a user or of which user is known initially, such as a merchandise coupon, a ticket or a passenger ticket.

In the IC chip in which different personal information for every user of the service is stored, it is required to write the personal information when the IC chip is given to the user by the facility of service. For writing the personal information about a user in the IC chip, it is required to use a rewritable memory and a circuit for controlling the rewritable memory, which may cause the increase in chip size. An IC chip in which personal information about a user is stored may be applied to a certificate such as a health insurance certificate or a life insurance certificate or an ID card of which user is known initially.

As another type of IC chip, there is one in which a different number unique to every individual IC chip (which is assigned by an IC chip manufacturer during the manufacture process) is stored. This type of IC chip has no rewritable memory, and therefore has an advantage that the chip size can be reduced compared to an IC chip having a rewritable memory. In the IC chip, it is required to write therein a number unique to every individual IC chip using a electron beam drawing machine or the like during the manufacture of the IC chip. When the electron beam drawing machine is used, the number unique to every individual IC chip can be written in the IC chip by melting a fuse of the ROM in the memory, and therefore the necessity of providing any memory-rewriting circuit to the circuit can be eliminated. From these reasons, the IC chip in which a number unique to every individual IC chip is stored may be useful when it is desired to assign a different number to every certificate (e.g., a health insurance certificate).

Figure 2:
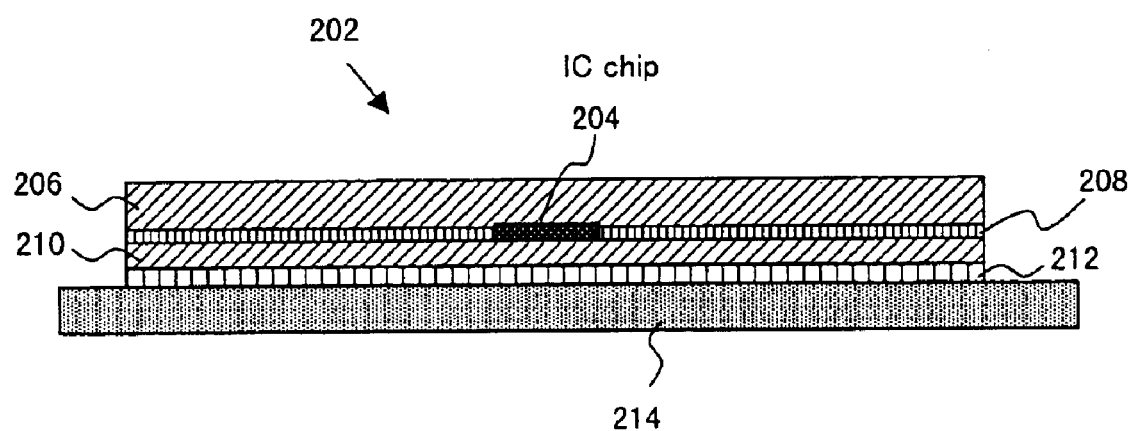
FIG. 2 is a cross sectional view of an embodiment of an IC chip-attached seal comprising an IC chip attached on a seal.
Figure 3:
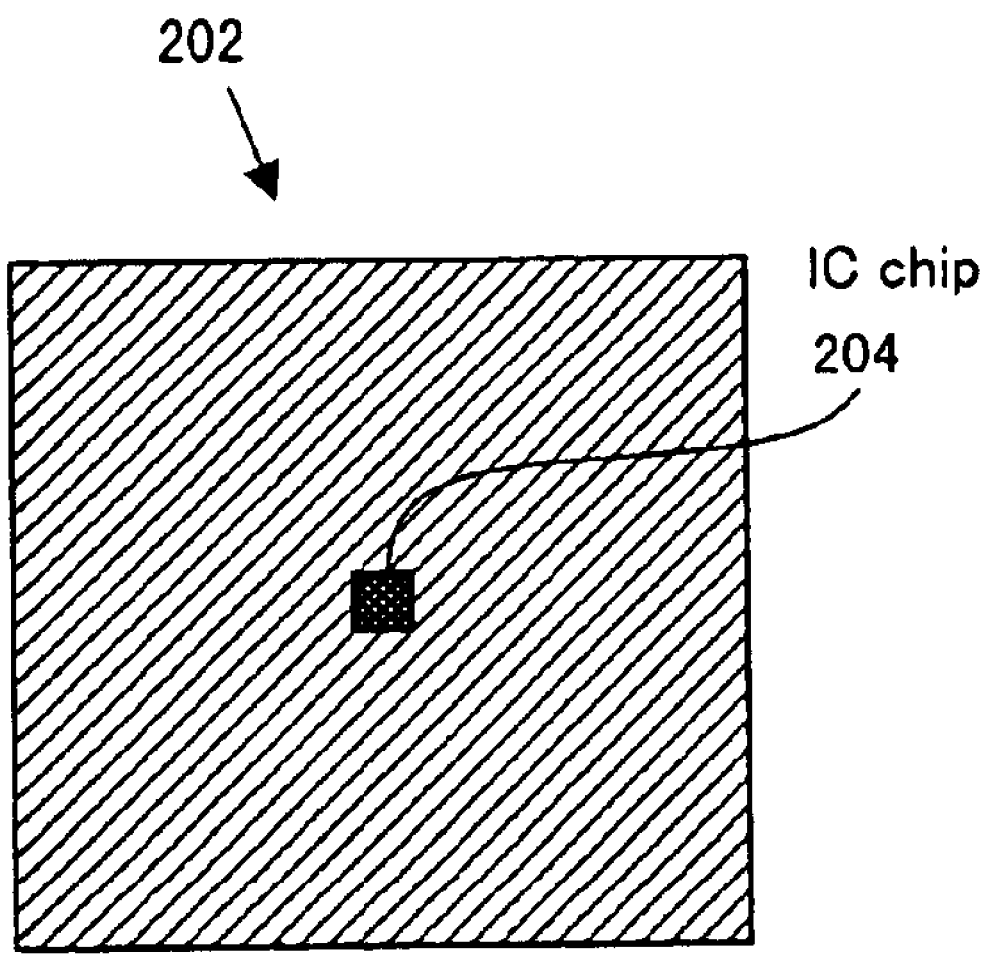
FIG. 3 is a cross sectional view of another embodiment of an IC chip-attached seal comprising an IC chip attached on a seal.

Since an IC chip is very small in size, it is usually used in the form integrated in a medium. FIG. 2 shows the cross sectional view of an embodiment of an IC chip-attached seal 202, in which the IC chip is mounted on a seal. The IC chip 204 is sandwiched between two pet films 206 and 210, and the IC chip 204 and the pet films 206 and 210 are adhered to one another with an adhesive 208. For the purpose of allowing the ready attachment of the IC chip-attached seal 202 to another object, an adhesive 212 is applied on the back surface of the pet film 219. A backing sheet 214 which protects the adhesive 212 is provided on the adhesive 212, so that the IC chip-attached seal 202 can be adhered onto another object readily simply by removing the backing sheet 214. FIG. 3 is a top view of the IC chip-attached seal 202 of FIG. 2. As shown in FIG. 3, the IC chip 204 is placed at a central portion of the IC chip-attached seal 202.

Figure 4:
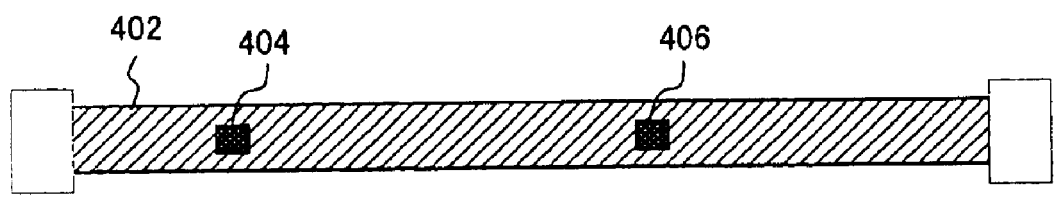
FIG. 4 is a view of an embodiment of an IC chi-attached tape comprising a plurality of IC chips arranged on a tape.

As another method for mounting the IC chip on a medium, it is possible to arrange a plurality of the IC chips on a medium in tape-like form. FIG. 4 shows a schematic illustration of the IC chips arranged in a tape-like form in which the IC chips 404 and 406 are integrated onto a tape 402. The cross section of each of the IC chips 404 and 406 is the same as that shown in FIG. 2. A characteristic advantage of the IC chips arranged in a tape-like form is that each IC chip can be transported and attached to other object readily because the tape having the IC chips can be stored in wrapped form like an adhesive tape (e.g., a cellophane tape). For adhering the IC chip onto a certificate or the like, a piece of IC chip is cut out from the tape having IC chips 402, the backing sheet is removed therefrom to expose the adhesive, and the adhesive surface is attached to the certificate.

As mentioned above, the IC chip includes two types: one in which an antenna is provided internally as shown in FIG. 1; and one to which external antennas are provided. In the case where an internal antenna is used, it is not needed to connect the IC chip to an external antenna, and therefore the integration of the IC chip into a medium (e.g., a seal) can be performed easily. However, since such an IC chip has only an internal antenna, the communication distance between the interrogator and the IC chip may be relatively short. In order to increase the communication distance between the interrogator and the IC chip, it is needed to use an external antenna which is provided to the IC chip externally.

Figure 5:
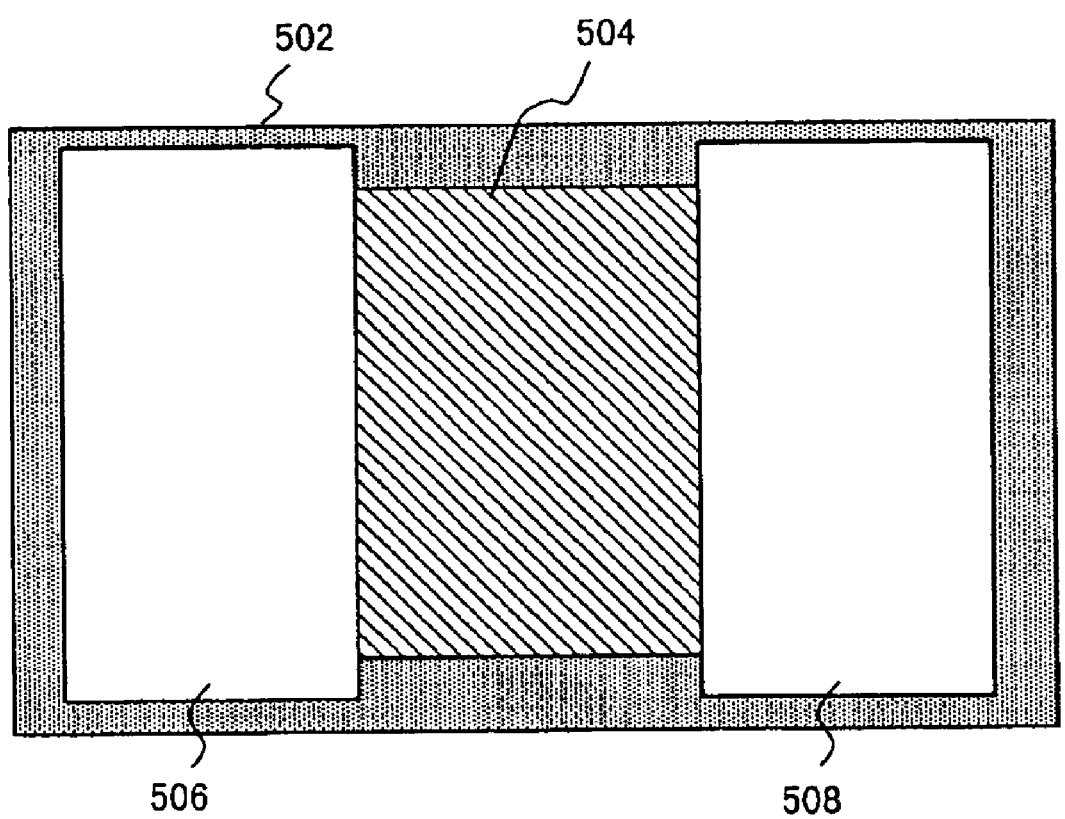
FIG. 5 is a view of an embodiment of a contactless IC chip having pads attached thereon.
Figure 6:
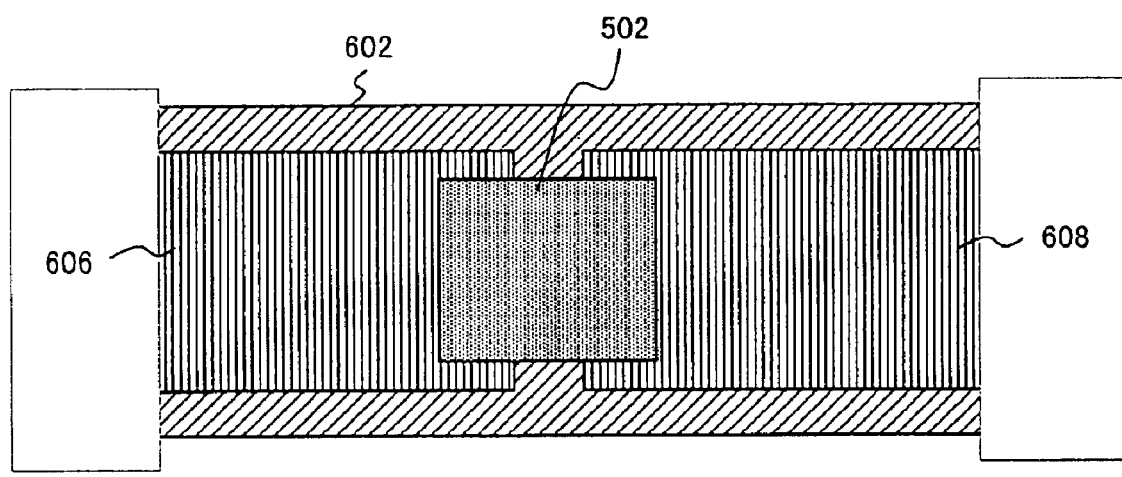
FIG. 6 is a view of an embodiment of the connection between a contactless IC chip having pads attached thereon with external antennas placed on a tape.

FIG. 5 is a view of an embodiment of an IC chip having pads for the connection of the IC chip to external antennas. The numeral 502 is the entire structure of the IC chip with pads, and the numeral 504 is the IC chip shown in FIG. 1 which lacks an antenna (i.e., which comprises an electric power, a logical circuit and a memory). Numerals 506 and 508 are pads for connecting the IC chip to external antennas. FIG. 6 is a plan view of the IC chip shown in FIG. 5 which is connected to external antennas. As shown in FIG. 6, the external antennas 606 and 608 are mounted on a tape 602. There is provided a gap between the external antennas 606 and 608, so that the both external antennas are mounted on the tape 602 in the state where they are electrically insulated to each other. The IC chip 502 is placed on the gap with turning upside down so that the IC chip 502 is connected to the external antennas 606 and 608. For the connection between the IC chip 502 and the external antennas 606 and 608, a conductive adhesive may be used. In this way, the pad 506 on the IC chip 502 is connected to the external antenna 606 and the pad 508 is connected to the external antenna 608.

Figure 7:
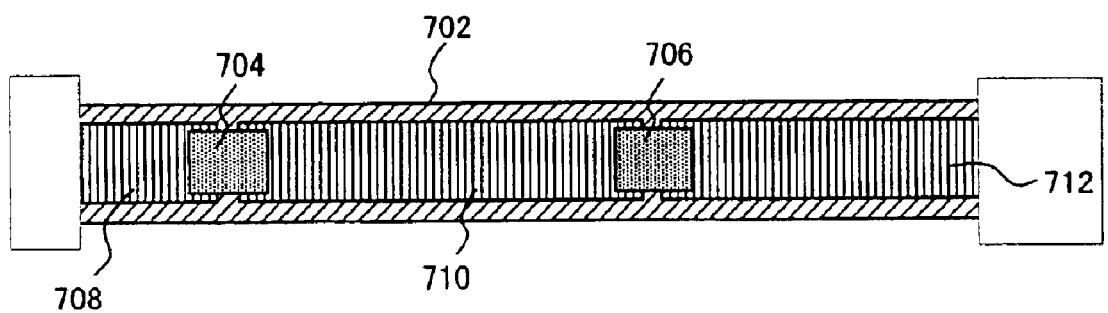
FIG. 7 is a view of an embodiment of an IC chip-attached tape comprising a plurality of contactless IC chips having pads which are connected to external antennas placed on a tape.
Figure 8:
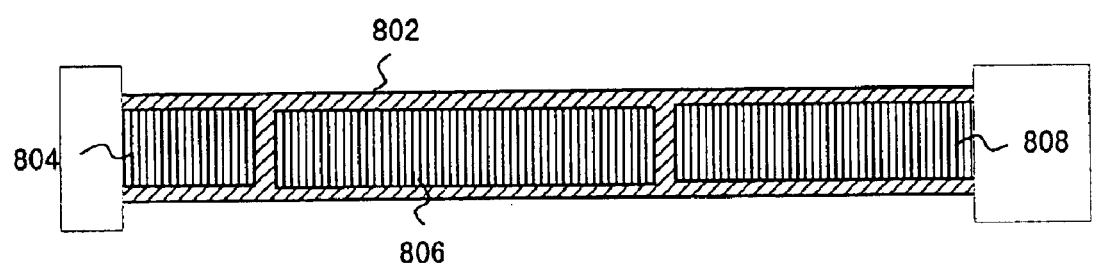
FIG. 8 is a view of an embodiment of a tape having external antennas thereon, which is intended to be attached onto the IC chip-attached tape of FIG. 7.
Figure 9:
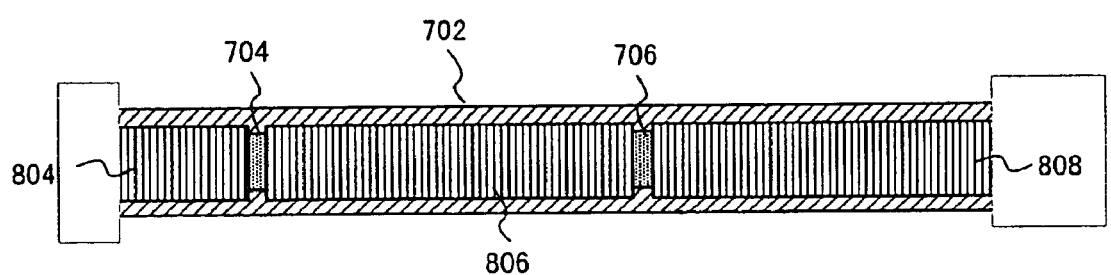
FIG. 9 is a view of an embodiment of an IC chip-attached tape in which external antennas are mounted on a plurality of IC chips from both of the front and back sides to ensure the connection between the IC chips and the external antennas.
Figure 10:
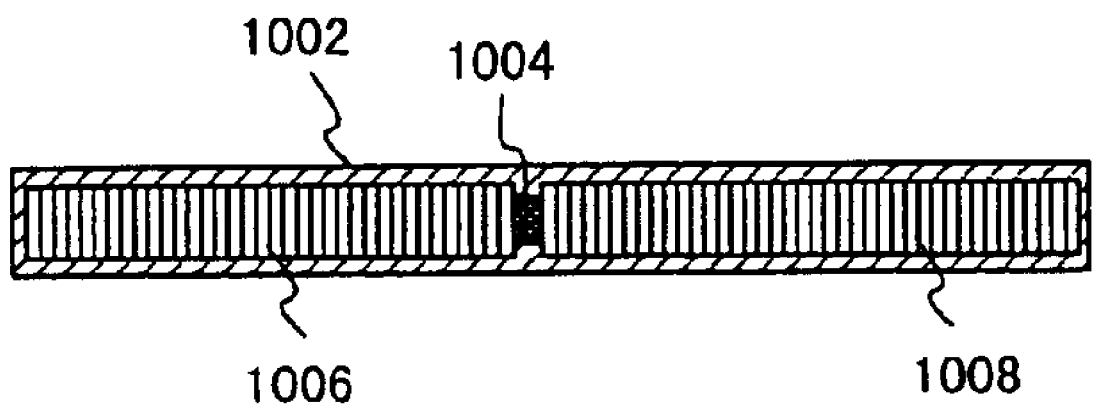
FIG. 10 is a view of an embodiment of an IC chip-attached tag which is produced by cutting the IC chip-attached tape.

Next, an effective method for placing the IC chip with external antennas will be described. FIG. 7 shows an embodiment of the arrangement of the external antennas and the IC chip on a long tape. On a tape 702, there are mounted external antennas 708, 710, 712 at regular wide intervals. Gaps are formed between the external antennas 708, 710 and 712 so that they are electrically insulated to one another. On the external antennas 708, 710 and 712, IC chips 704 and 706 are placed. The IC chip has the front and back surfaces. Accordingly, when it is difficult to place the IC chip on the external antennas with the back surface with pads down, a tape 802 having another external antennas 804, 806 and 808 thereon as shown in FIG. 8 is additionally adhered on the tape 702 so as to ensure the connection between the IC chips 704 and 706 to the external antennas. The resulting IC chip-attached tape is shown in FIG. 9, in which the tape 802 is removed. The IC chips 704 and 706 are connected to either of the external antennas 708, 710 and 712 or the external antennas 804, 806 and 808. The resulting tape-shaped construct is cut at appropriate sites on the external antennas so that tags with IC chip (hereinafter, also referred to as "IC chip-attached tags") each of which contains an IC chip can be produced. An IC chip-attached tape of this type is usually used for production of an IC chip tag or tags. The IC chip-attached tag 1002 shown in FIG. 10 has an IC chip 1004 to which external antennas 1006 and 1008 are connected.

Figure 11:
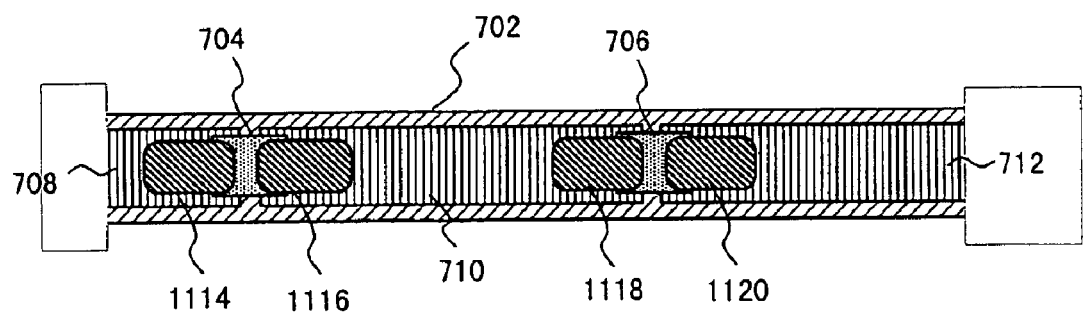
FIG. 11 is a view of an embodiment of an IC chip-attached tape in which conductive microparticles are printed on the junctions between IC chips and external antennas using printing technology so as to ensure the connection between the IC chips and the external antennas.

When IC chips are placed on a tape randomly irrespective of whether the surface appearing on the tape is the front or back surface, another methods may be employed for ensuring the connection of the IC chips and external antennas. One of the methods uses conductive microparticles (e.g., carbon microparticles) which connect between the external antennas and pads on the IC chips when printed thereon. In this method, the conductive microparticles may be splayed over the tape 702 so that the IC chips 704 and 706 can be connected to the external antennas even when the IC chips have no pad attached thereto. An example of this embodiment is illustrated in FIG. 11. An area 1114 on which conductive microparticles are printed allows to connect an IC chip 704 to an external antenna 708. When the IC chip 704 is placed on the tape 702 with the back surface down, since the back surface of the IC chip 704 is already succeeded in connection to the external antenna 708, the microparticle-printed area 1114 has no effect on the connection. In FIG. 11, microparticle-printed areas 1114 and 1116 and 1118 and 1120 allow the connection between the IC chips 704 and the external antennas 1108 and 1110 and the IC chip 706 and the external antennas 1110 and 1112, respectively. Generally, an ink-jet type of printing method enables to control a print pattern with a good precision and at low costs. Accordingly, when the printed areas 1114, 1116, 1118 and 1120 with conductive microparticles are formed by ink-jet printing of the conductive microparticles, the preparation cost of an IC chip-attached tape may be reduced.

Figure 12:
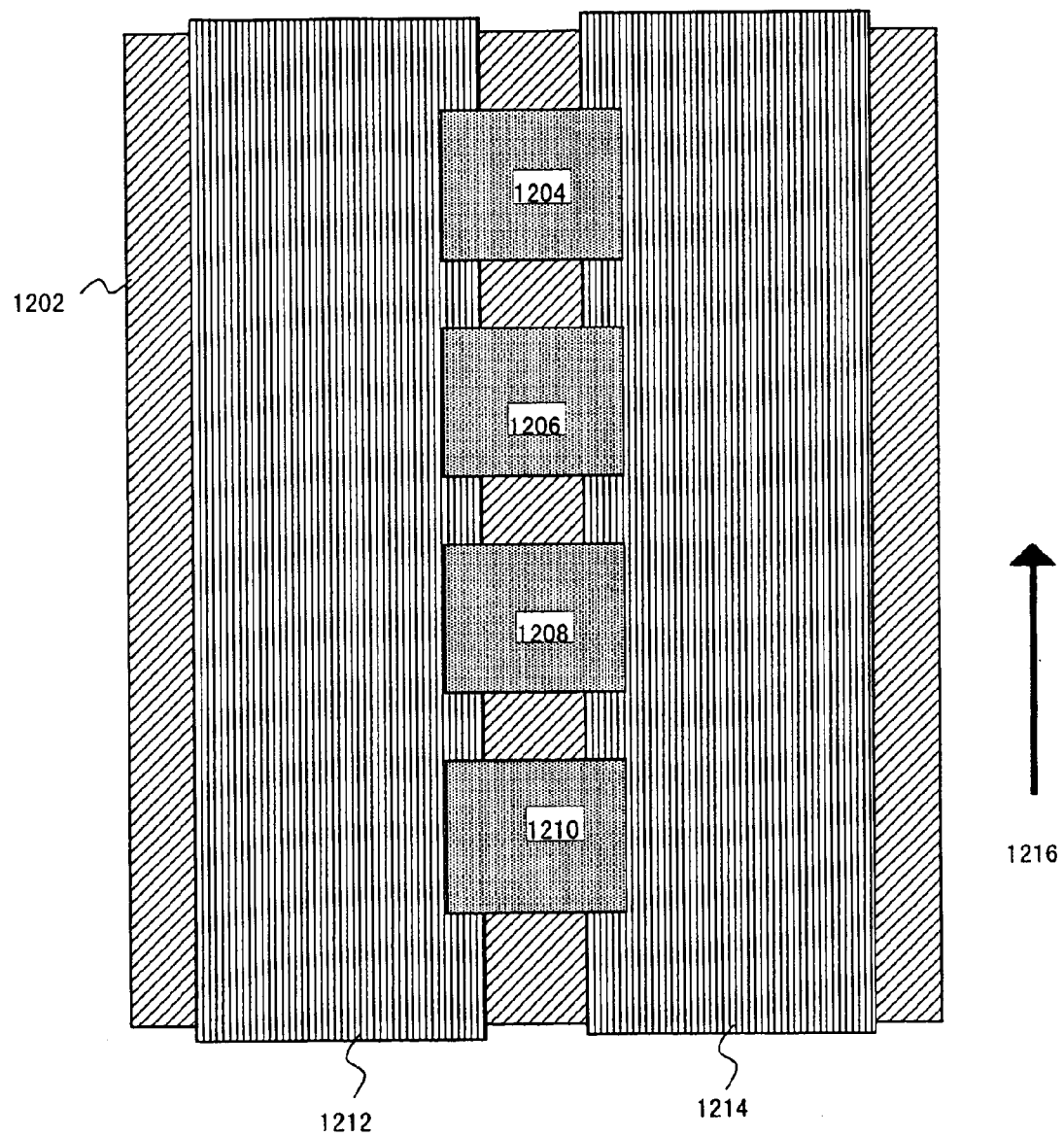
FIG. 12 is a view of an embodiment of an IC chip-attached tape in which two external antennas are mounted in parallel with each other on a tape and IC chips are placed between the external antennas so as to connect the IC chips with the external antennas.

Since an IC chip is usually very small, the procedure for positioning of an IC chip 704 between external antennas 708 and 710 while adjusting its position precisely in lateral and vertical directions in FIG. 7 is complicated to control, resulting in the increase in manufacture cost of the IC chip. In order to improve this problem, a method may be employed in which a precise positioning of an IC chip should be performed in only one direction, as shown in FIG. 12. In this method, two external antennas 1212 and 1214 are mounted on a tape 1202 having the width which is same as the length of an IC chip-attached tag to be produced (see 1002 in FIG. 10), and IC chips 1204, 1206, 1208 and 1210 are placed between the external antennas 1212 and 1214 to connect the IC chips to the external antennas. Although the IC chips should be placed precisely over the gaps between the external antennas, it is not needed to position the IC chips precisely in the direction along the tape (1216). Since the precise positioning of the IC chips is needed only in the direction along the movement of the tape, the arrangement of the IC chips becomes easy. The tape 1202 having thereon the IC chips 1204, 1206, . . . may be cut appropriately in the lateral direction to produce IC chip-attached tags.

Figure 13:
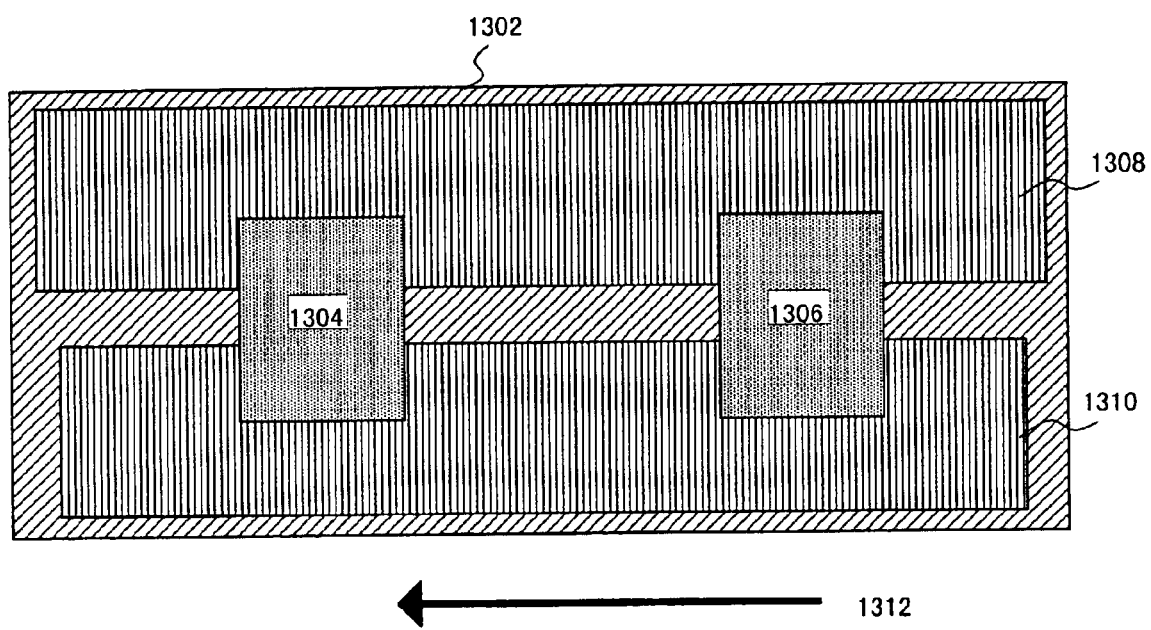
FIG. 13 is a view of another embodiment of an IC chip-attached tape in which two external antennas are mounted in parallel with each other on a tape and IC chips are placed between the external antennas so as to connect the IC chips with the external antennas.
Figure 14:
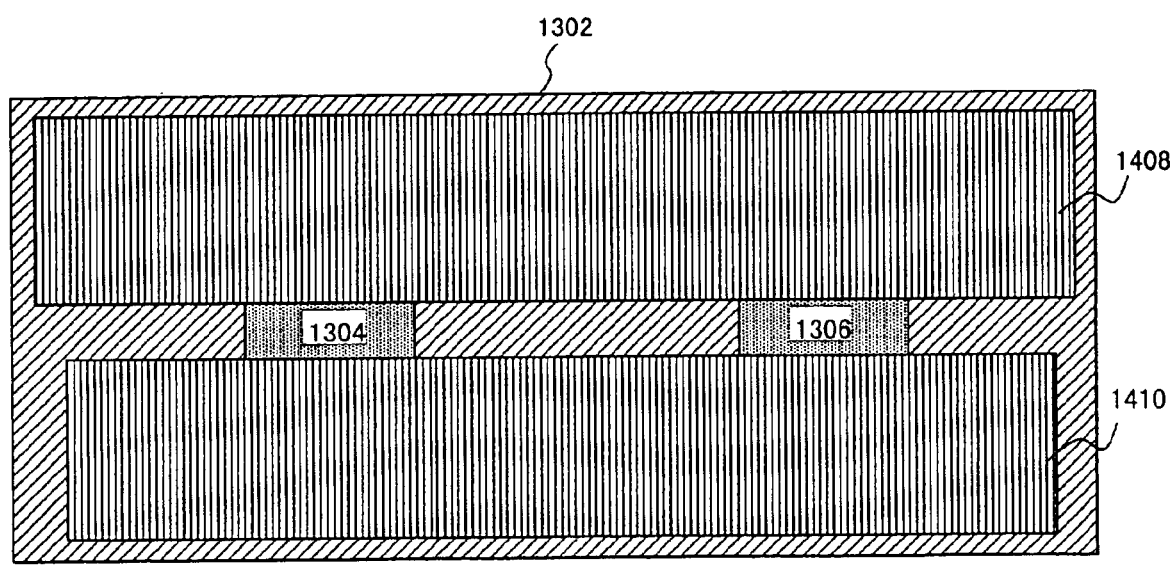
FIG. 14 is a view of an embodiment of an IC chip-attached tape in which two external antennas are mounted in parallel with each other on a tape, IC chips are placed between the external antennas so as to connect the IC chips with the external antennas, and additional external antennas are placed over the IC chips to ensure the connection between the IC chips and the external antennas.
Figure 15:
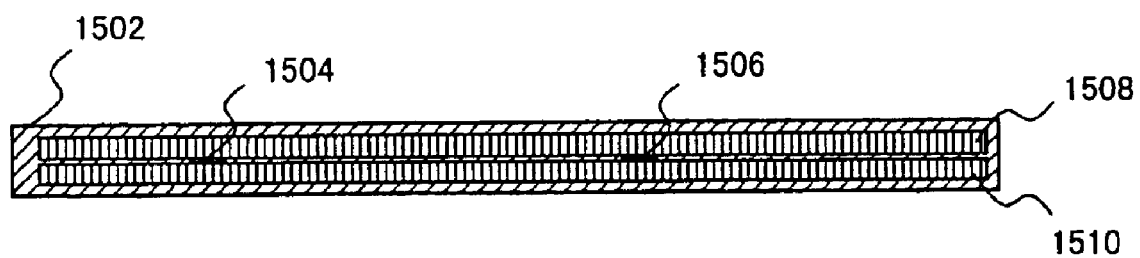
FIG. 15 is a view of an embodiment of a finished IC chip-attached tape.
Figure 16:
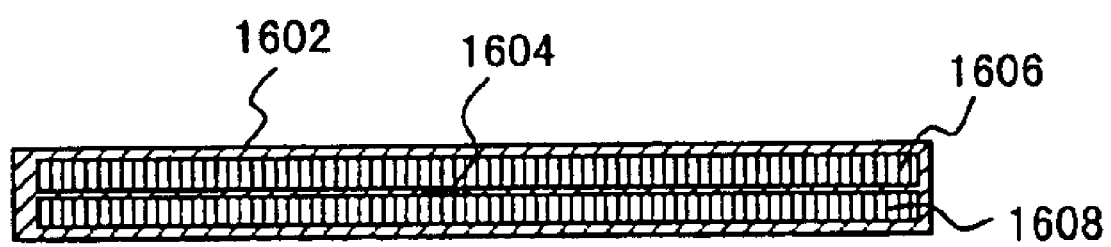
FIG. 16 is a view of an embodiment of an IC chip-attached tag which is produced by cutting the IC chip-attached tape of FIG. 15.

Another method for arrangement of the IC chips is shown in FIG. 13. External antennas 1308 and 1310 are mounted parallel to each other on a tape 1302. IC chips 1304 and 1306 are placed on the external antennas 1308 and 1310 to connect the IC chips to the external antennas. In this configuration, pads 506 and 508 on each IC chip are connected to the external antennas 1308 and 1310, respectively. As in the case of the embodiment shown in FIG. 12, it is good enough to place the IC chips precisely only in the direction along the movement of the tape 1312, and it is not needed to space between the IC chips 1304 and 1306 so much precisely. As in the case of the embodiment shown in FIG. 7, when it is difficult to control the arrangement of the front or back surface of each of the IC chips (because the IC chip is very small), a tape only having external antennas may be adhered over the IC chips to ensure the connection between the IC chips and the external antennas. FIG. 14 is a top view of this arrangement, in which the upper tape is removed. The IC chips 1304 and 1306 are sandwiched by the external antennas 1308 and 1408 and the external antennas 1310 and 1410, respectively. FIG. 15 is a cross sectional view of the resulting tape with IC tags 1502, in which the front surfaces and the back surfaces of the IC chips 1504 and 1506 contact with external antennas 1508 and 1510, respectively. The tape with IC chip tag 1502 is appropriately cut between the IC chips 1504 and 1506 to produce IC chip tags as shown in FIG. 16 (see an IC chip tag 1602 in FIG. 16). In the IC chip tag 1602, the IC chip 1604 is connected to external antennas 1606 and 1608.

Since a memory of an IC chip in an IC chip-attached seal cannot be rewritten easily, the use of an IC chip for a certification purpose may be effective for the prevention of counterfeiting. By utilizing this feature of an IC chip, it can be achieved to prevent the counterfeiting of a certificate more effectively.

Figure 17:
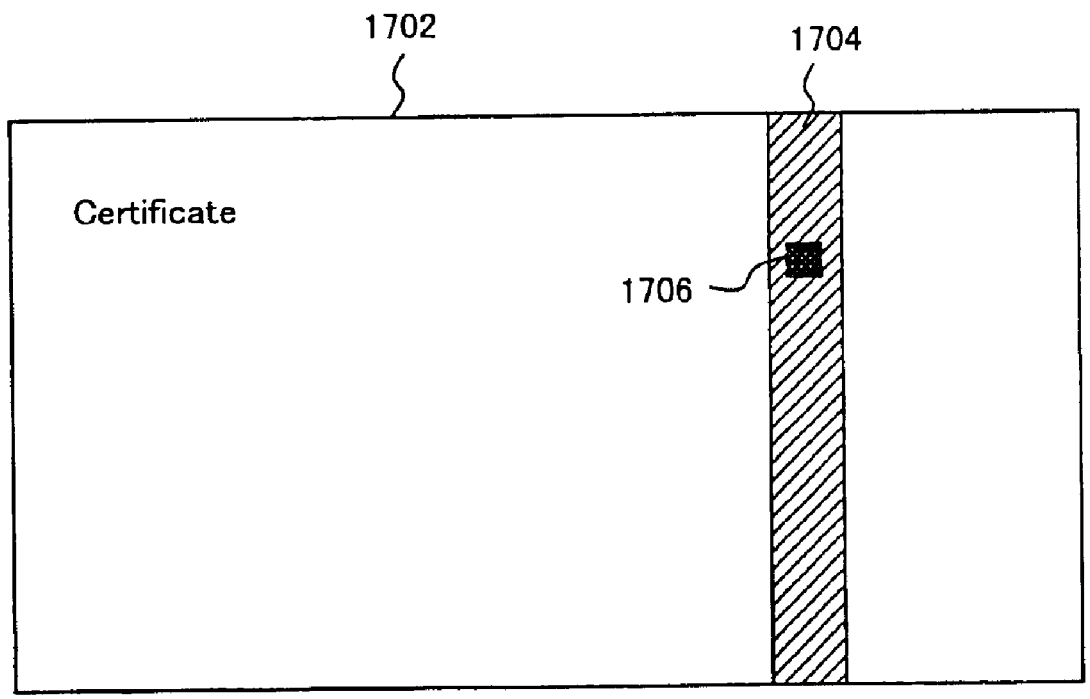
FIG. 17 is a view of an embodiment of a certificate having an IC chip-attached tape mounted thereon.

FIG. 17 shows an embodiment of a certificate 1702, on which an IC chip-attached tape (i.e., an IC chip placed on a tape) is mounted to make the counterfeiting of the certificate more difficult. An IC chip-attached tape 1704 has an IC chip 1706 therein and is mounted on a certificate 1702. In this state, information of the IC chip 1706 is read by an interrogator to check the soundness of the certificate 1702, whereby the genuineness of the certificate 1702 can be determined. In a certificate of this type, counterfeiting can be prevented more effectively than a certificate in which the prevention of counterfeiting is performed using printing technology, because an IC chip which is hard to counterfeit is used. In this case, the information to be stored in the IC chip may be any one of information about a facility of service which manages a service, information about a user, a number which is assigned to the IC chip uniquely and any combination thereof, depending on the purposes of the certification and the intended use of the certificate.

To ensure a more effective prevention of counterfeiting, it is desirable to utilize the combination of the information stored in the IC chip 1706 and the information printed on the certificate. In the method as shown in FIG. 17, there is a possibility that a counterfeited IC chip-attached certificate may be produced by counterfeiting the certificate 1702 itself using printing technology and replacing the IC chip with other one which has been stripped from other IC chip-attached certificate on the counterfeited certificate. For example, in the case of an IC chip-attached passport in which information (which is identical among all users) issued from a certificate institution is stored, the passport may be counterfeited by counterfeiting the passport itself and replacing the IC chip with another one which is strip off from other IC chip-attached passport. The counterfeiting technique of this type is called an "IC chip counterfeiting by posing as". One of the methods for preventing the counterfeiting of this type is to print a content which is obtained by modifying the information in the IC chip onto the surface of the certificate.

There are two methods for the modification, depending on the situation where the information in the IC chip is different or identical among individual IC chips. Even when the information in the IC chip is different among individual IC chips, if there is no relationship between the information printed on the surface of the certificate and the information in the IC chip, the "counterfeiting by posing as" is possible. One method for reducing the possibility of the "counterfeiting by posing as" is to use a digital signature generated by a public key cryptosystem.

The public key cryptosystem (also refereed to as an "asymmetric cryptosystem") has a feature that two different keys (i.e., a public key and a secret key) are used, and RSA is a typical one. The public key is a key for generating a cryptogram and usually is made public. The secret key is a key for decrypting the cryptogram and kept secret by an owner "A" of the asymmetric cryptogram. Since the public key is made public, when data is sent to the owner "A", the concealment of the data can be achieved by sending the data in the form which is encrypted with the public key. The owner "A" decrypts the encrypted data with the secret key of his own and retrieves it. To certify that data "x" is the data sent by the owner "A", the data "x" is encrypted with a secret key "sk" of the owner "A" (which is referred to as the "generation of a digital signature"). Here, the result is represented by "[x] sk". A person who receives "x" and "[x] xk" retrieves "x1" from "[x] sk" with a public key "pk". When it is confirmed that "x1" and "x" are identical with each other, it can be recognized that the data "x" is the data sent from the owner "A".

The manner for RSA encryption can be expressed by equation (1):

$$y = x**e \bmod n \qquad (1)$$

wherein "e" and "n" represent public keys; "x" represents a data to be encrypted; "**" means to perform a power calculation; and "mod" means to perform a modular calculation.

The manner for decryption can be expressed by equation (2):

$$x = y**d \bmod n \qquad (2)$$

wherein "d" and "n" represent secret keys; "y" represents a data to be decrypted; and "mod" means to perform a modular calculation.

The manner for generation of a digital signature using RSA can be expressed by equation (3):

$$y=x^{**}d \bmod n \quad (3)$$

wherein "d" and "n" represent secret keys; "x" represents a data to be digitized to generate a digital signature; and "mod" means to perform a modular calculation.

The manner for validation of the digital signature can be expressed by equation (4):

$$x=y^{**}e \bmod n \quad (4)$$

wherein "e" and "n" represent public keys; "y" represents a resulting digital signature; and "mod" means to perform a modular calculation.

The method for utilizing a digital signature is as follows. A digital signature generated by digitizing the information in the IC chip with a secret key of a facility of service is printed on an IC chip-attached certificate. In the determination of soundness of the IC chip-attached certificate, if the result from the decryption processing of the information printed on the certificate with a public key is identical with the information in the IC chip, then it can be recognized that a correspondence between the printed digital signature and the IC chip is established, whereby the soundness of the certificate is certified. In this method, it is required to print the digital signature for the information in the IC chip on the surface of the certificate. Since such a printing constraint is added, the counterfeiting of the certificate becomes more difficult.

To make the counterfeiting of a certificate more difficult, a method may be employed in which a digital signature for the combination of information in the IC chip and important information printed on the surface of the certificate is also printed on the surface of the certificate. This method is effective for the prevention of counterfeiting even when the information in the IC chip does not vary from one certificate to another. Examples of the important information include an owner's name in the case of a passport and a denomination or face value in the case of a paper money. Here, assume that each of the certificates has an IC chip which stores only information which is identical among the individual IC chips, for example paper moneys each having the same IC chip independently on the face value. In this case, when an IC chip on a paper money having a face value of 1,000 yen is removed and put on other paper money having a face value of 10,000 yen, the "IC chip counterfeiting by posing as" cannot be prevented. In this method, however, both information "x1" in the IC chip and important information "x2" printed on the certificate are used to determine a digital signature "y" according to equation (5) (wherein "x2" represents a face value of a merchandise coupon or a paper money or an owner's name of a passport):

$$y=(x1+x2)^{**}d \bmod n \quad (5)$$

In equation (5), the operation "x1+x2" means to link the characters of "x1" and "x2" to each other, or to convert the character strings of "x1" and "x2" into numeric values, respectively, and combine the numeric values. Generally, the time required for the processing can be reduced by making the calculation result shorter. Accordingly, it is convenient to use a value given by hashing the processing result of "x1+x2" with a hash function in place of (x1+x2). On the certificate, "x2" and "y" are printed. "d" represents a secret key of a facility to issue the certificate. For the confirmation of the soundness of the IC chip-attached certificate, "z" in equation (6) may be determined using a public key "e" which corresponds to "d".

$$z=y^{**}e \bmod n \quad (6)$$

The "z" corresponds to (x1+x2) in equation (5), such as information in the IC chip+information of the face value. Then, the content of the IC chip is read, and the information in the IC chip is subtracted from "z". As a result, information of the face value can be obtained as expressed in equation (7).

$$x2=z-x1 \quad (7)$$

When "x2" is identical with the information of the face value printed on the surface of the certificate, then it is recognized that the certificate is sound. In the case where a hashed value is used as "y", when the result "z" obtained according to equation (6) is identical with a value obtained by hashing the calculation result of (x1+x2) (i.e., a result of the operation "+" of the information "x1" in the IC chip with the important information "x2" printed on the surface of the certificate), then it is recognized that the certificate is sound.

The method for determining the soundness of a certificate using information in an IC chip and information printed on the certificate as mentioned above, is called a "method for confirmation of soundness using information in IC chip and information printed on certificate". In the embodiment described here, although a pubic key cryptography is exemplarily employed, a symmetric cryptography (e.g., DES) may also be employed. In a symmetric cryptography, however, a countermeasure against the risk of a key of symmetric cryptography being revealed is needed.

Figure 18:
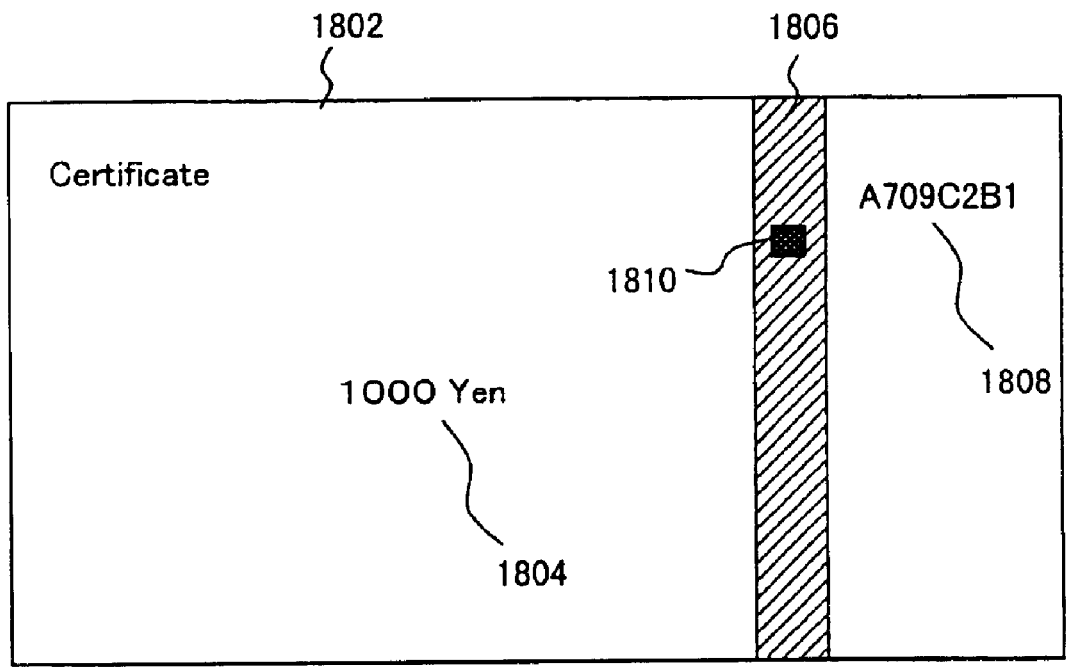
FIG. 18 is a view of an embodiment of a certificate having an IC chip-attached tape placed thereon, on which there is printed a digital signature generated by digitizing the combination of information of the IC chip and information on the front value (i.e., denomination) of the certificate with a secret key.

FIG. 18 shows an embodiment of the "method for confirmation of soundness using information in IC chip and information printed on certificate". As shown in FIG. 18, information of the face value 1804 of a certificate 1802 (e.g., a merchandise coupon) and information in an IC chip 1810 placed on a tape 1806 are encrypted with a secret key, and the result is printed on the certificate as information 1808. By decryption of the information 1808 with a public key, information corresponding to both the information in the IC chip and the information of face value can be obtained. When the obtained information is identical with the actual information, then it is recognized that the certificate 1802 is sound. For example, even when a counterfeiter attempts to change or modify the information of face value 1804 (i.e., 1,000 yen) of the certificate into 10,000 yen, since the counterfeiter cannot know the secret key, he cannot obtain e digital signature 1808. Accordingly, even when only the information about face value 1804 is counterfeited, the "IC chip counterfeiting by posing as" can be found out easily upon confirming the soundness of the certificate.

Figure 19:
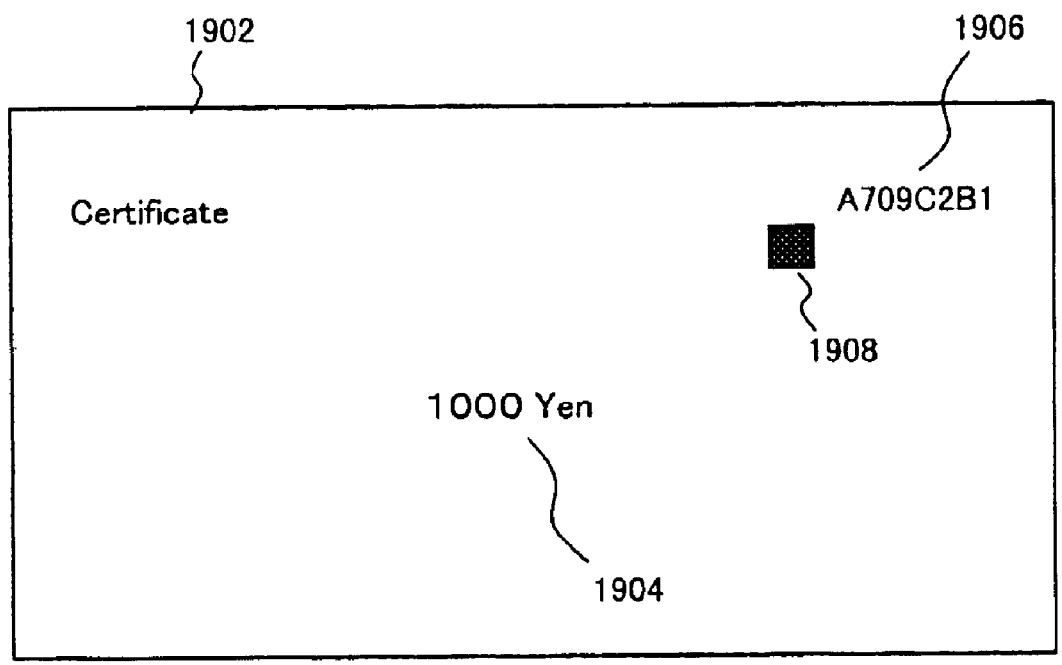
FIG. 19 is a view of an embodiment of a certificate having an IC chip attached thereon or buried therein.

FIG. 19 shows an embodiment of an IC chip-attached certificate in which an IC chip 1908 is directly place on or put in (i.e., buried in) a certificate 1902. As used herein, the term "put in (or buried in)" means that, in the case where the medium of a certificate or the like is made of paper having a predetermined thickness, an IC chip is put in the paper medium during the process for making the paper medium from raw materials. A digital signature, which is a result for the combination of the information of face value 1904 and the information in the IC chip 1980, is printed on the certificate 1902 as information 1906.

Figure 20:
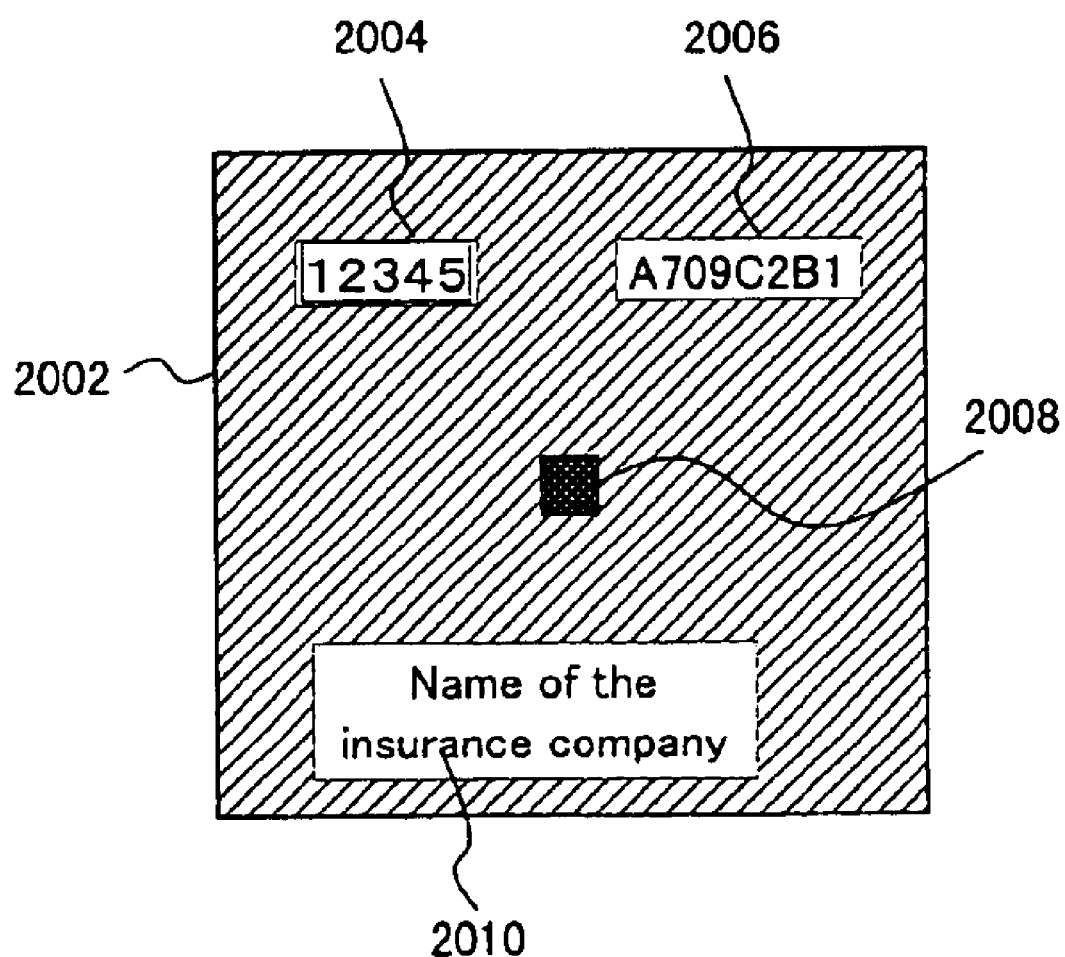
FIG. 20 is a view of an embodiment of an IC chip-attached seal on which there is printed a digital signature obtained by digitizing the combination of information of the IC chip and information on the certificate number with a secret key.

FIG. 20 shows an embodiment of an IC chip-attached tape on which some pieces of information are printed on the tape.

In this embodiment, a digital signature 2006 for the combination of the number 2004 of the certificate with information in an IC chip 2008 is printed on the surface of the seal 2002. In this embodiment, the information printed on an IC chip-attached certificate (seal) may be information which is readable with a mechanical means (e.g., a bar code). To make the counterfeiting of an IC chip-attached seal or tag more difficult, a hologram or an aluminum foil may be printed or place on the surface of the seal or tag.

Figure 21:
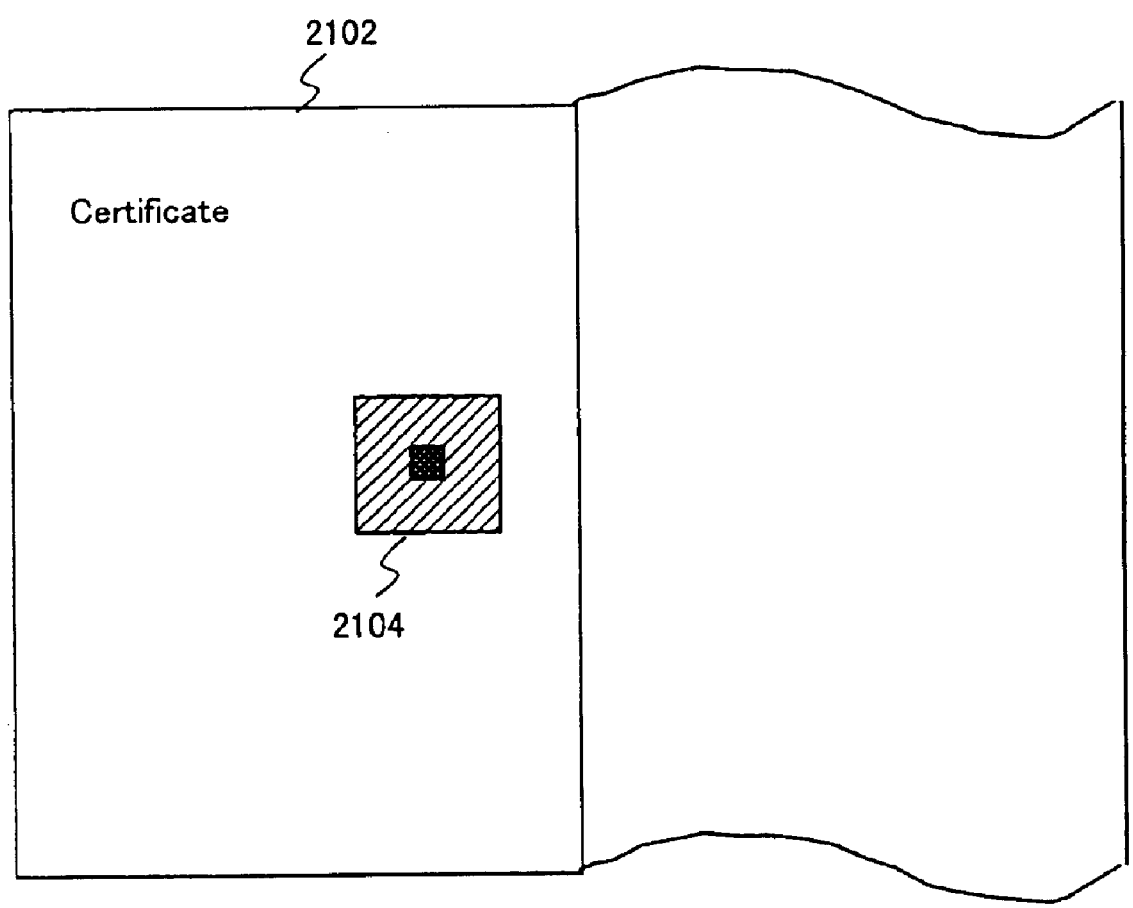
FIG. 21 is a view of an embodiment of the mounting of an IC chip-attached seal for the distribution to a user, in which the IC chip-attached seal is held between the leaves of a laminate-type post card.
Figure 22:
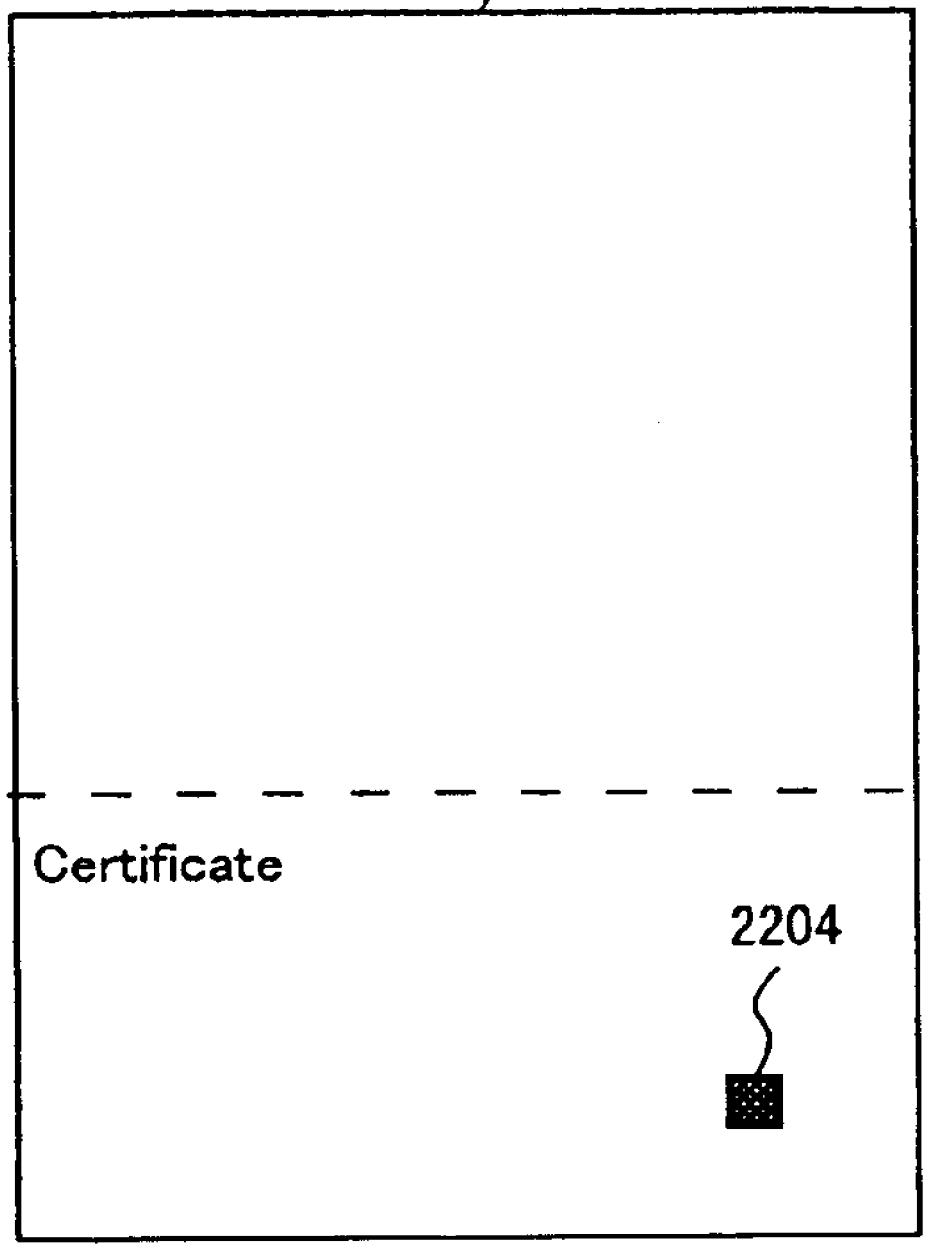
FIG. 22 is a view of an embodiment of the mounting of an IC chip-attached seal for the distribution to a user, in which the IC chip-attached seal is integrated in a post card which contains a certificate.
Figure 23:
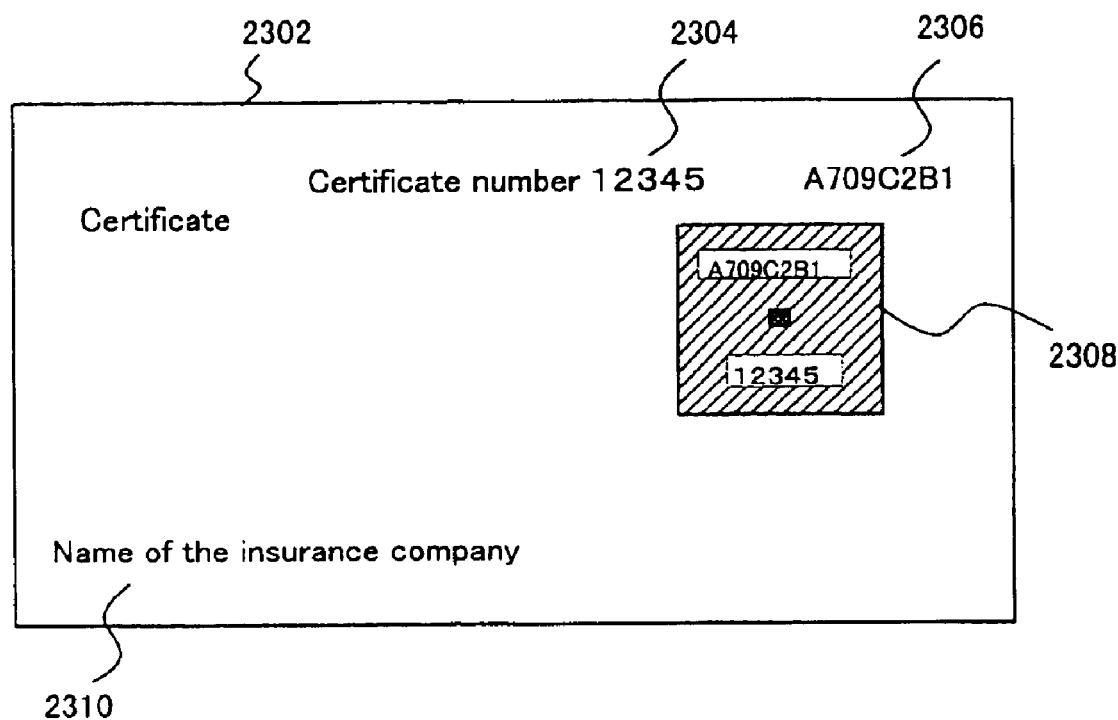
FIG. 23 is a view of an embodiment of a certificate on which an IC chip-attached seal is placed.

FIG. 21 illustrates a method for sending an IC chip-attached seal by mail in the form attached on a post card. A certificate such as an insurance certificate is often sent to a contractant by mail. An IC chip-attached seal is smaller compared with a paper certificate. Accordingly, when only an IC chip-attached seal is to be sent by mail, if it is possible to send the seal using a post card rather than an envelope, then reduction in mailing cost would be expected. According to this embodiment, an IC chip-attached seal 2104 is held between the leaves of a lamination-type post card 2102 which can be sealed by application of press. FIG. 22 shows an embodiment of a post card 2202 into which an IC chip 2204 is put (buried) to send an IC chip-attached certificate to a contractant by mail. FIG. 23 shows an embodiment of a certificate 2303 on which an IC chip-attached seal having a backing sheet 2308 on the back side is mounted. According to this embodiment, both the certificate and the IC chip-attached seal can be sent simultaneously. On the certificate 2302, the name of an insurance company 2310, the number of the certificate 2304 and a value of a digital signature 2306 are printed. The certificate number 2304 and the value of the digital signature 2306 are also printed on the IC chip-attached seal 2308.

An interrogator for IC chip transfers data to the IC chip by feeding a command to the IC chip via radio frequencies. In the application of an IC chip to a certificate, if a mobile telephone also serves as an interrogator for IC chip, then the mobile telephone can be used for the determination of the soundness of an IC chip-attached certificate, and therefore the determination of soundness becomes more convenient. Another benefit from using a mobile telephone which also serves as an interrogator is the reduction in manufacture cost of an interrogator. A mobile telephone which also serves as an interrogator may be used by a facility to execute service or a user of the service. As an example of the application of such a mobile telephone by a facility of service, there may be mentioned a case where the validity of a user who brings an IC chip is determined using the mobile telephone which also serves as an interrogator for the IC chip. Since a device like a mobile telephone is often used routinely in a store or the like, the use of a mobile telephone which also serves as an interrogator is effective for the cost reduction and the reduction of spaces occupied by the devices. As an example of the use of a mobile telephone which also serves as an interrogator by a user who wants to obtain a service, there may be mentioned a case where the user obtains a service using an IC chip via a mobile telephone of his own.

Figure 24:
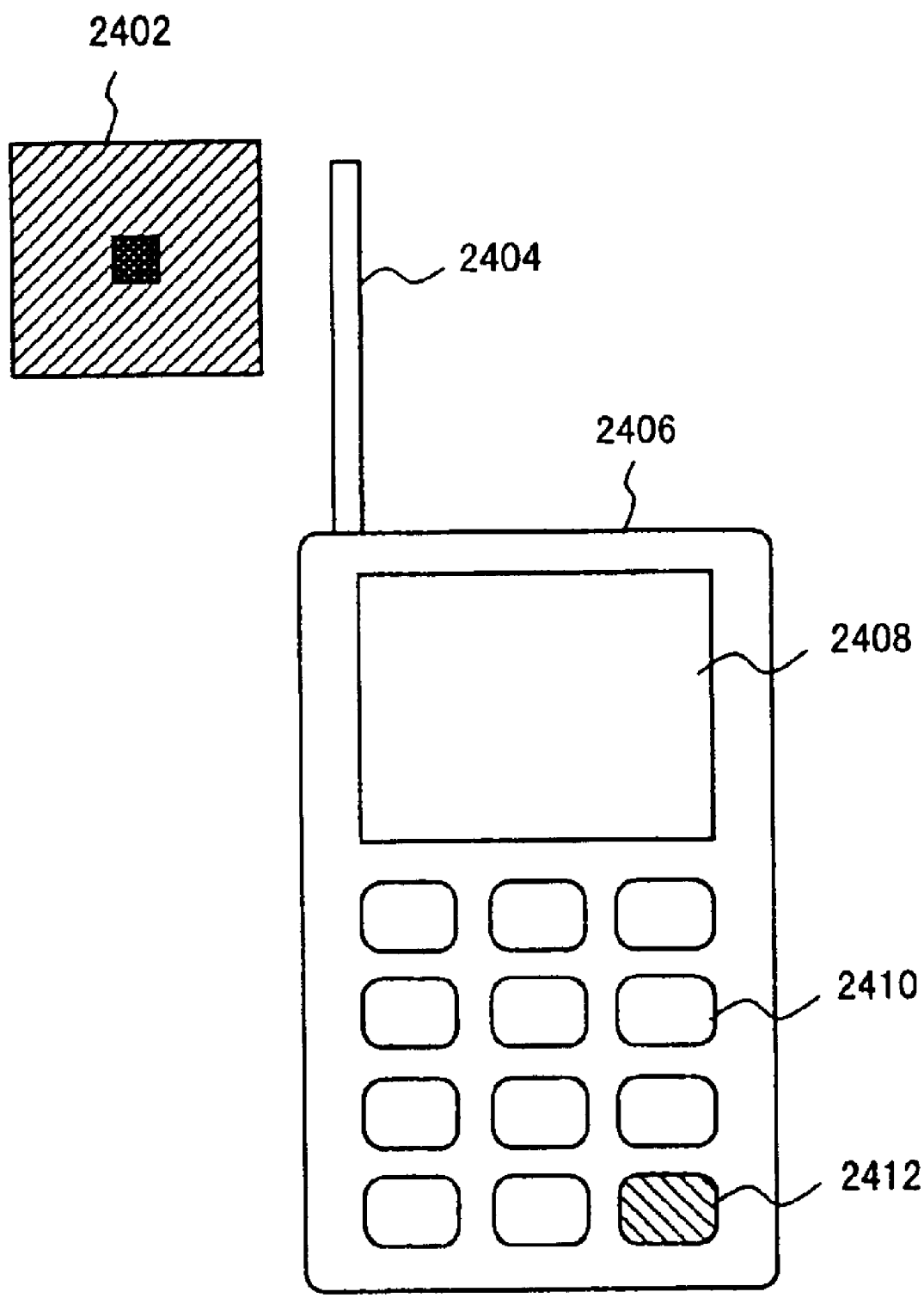
FIG. 24 shows an appearance of an embodiment of a mobile telephone which also serves as an interrogator for IC chip.

FIG. 24 is a view illustrating an embodiment of a mobile telephone 2406 which also serves as an interrogator for an IC chip-attached sheet 2402. The mobile telephone 2406 which also serves as an interrogator has a function-selecting switch 2412 which can switch between a function as an interrogator for the IC chip and a function as a mobile telephone. The switching between the function as an interrogator and the function as a mobile telephone can be performed using the switch 2412.

Figure 25:
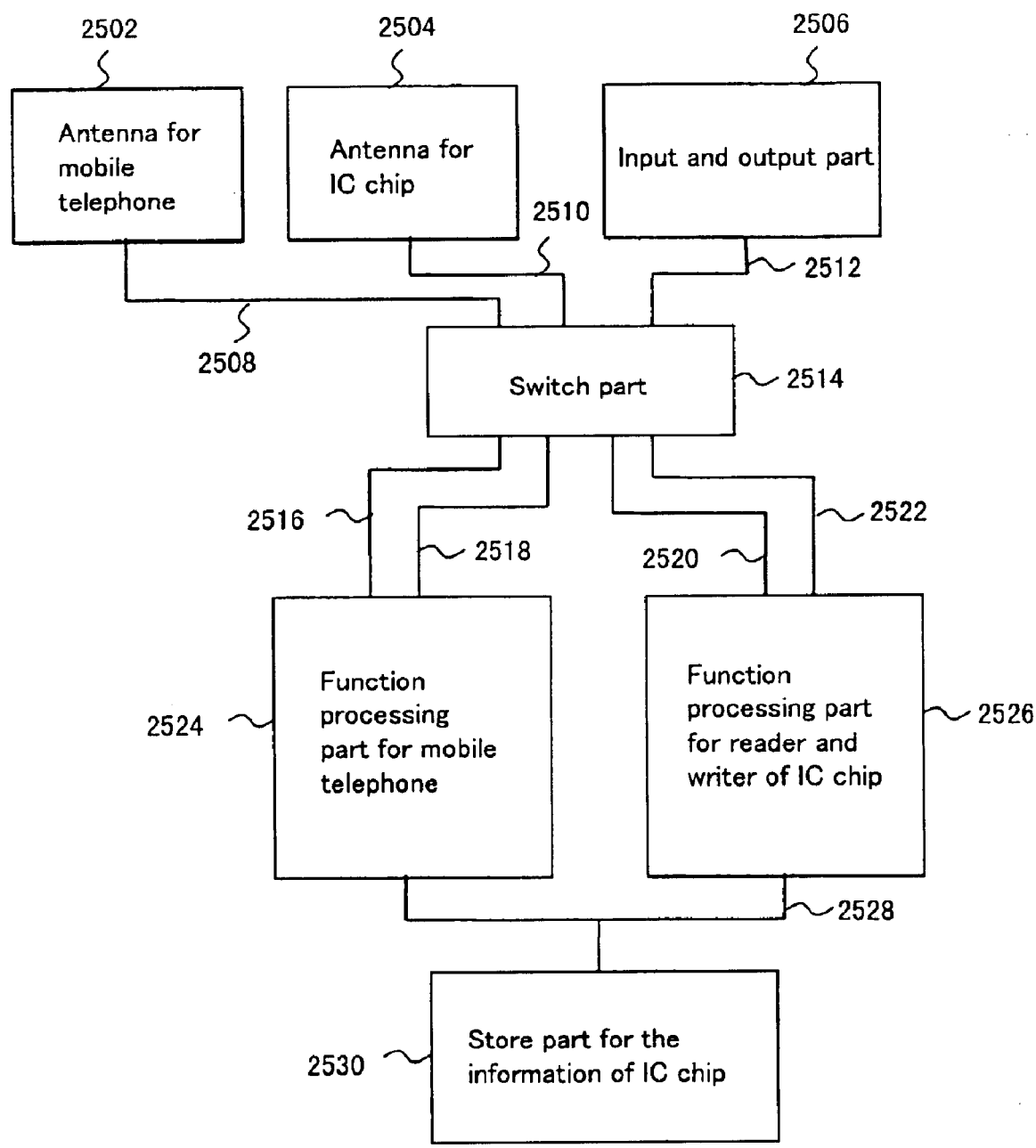
FIG. 25 shows the configuration of an embodiment of a mobile telephone which also serves as an interrogator for IC chip.

FIG. 25 is a block diagram showing the function of an embodiment of the mobile telephone 2406 which also serves as an interrogator for an IC chip. The mobile telephone has both a mode as a mobile telephone (hereinafter, referred to as a "mobile telephone mode") and a mode as an interrogator for IC chip (hereinafter, referred to as an IC chip-interrogator mode"). These modes can be selected appropriately using a switch part 2514. Upon selecting the IC chip-interrogator mode, an antenna for IC chip 2504, a function-processing part for interrogator of IC chip 2526 and an input/output part 2506 are interconnected. A store part for information of IC chip 2530 is connected to the function-processing part for interrogator of IC chip 2526 and the function-processing part for mobile telephone 2524, and can be operated in either mode. In the IC chip-interrogator mode, inputting as an IC chip-interrogator is performed with buttons 2410 of the mobile telephone and the output is displayed on a screen 2408. The information read from the IC chip is, if necessary, stored in a store part for the information of IC chip 2530. Upon selecting the mobile telephone mode, the switch part 2514 establishes the interconnection between an antenna for mobile telephone 2512, the input/output part 2506 and the function-processing part for mobile telephone 2524, whereby the mobile telephone which also serves as an IC chip-interrogator can perform the functions as a conventional mobile telephone.

As one application example of the mobile telephone mode, when the information read from the IC chip is to be used, the information may be retrieved from the store part for information of IC chip 2530 in which the information read from the IC chip has been stored previously. As an example of the application, there may be mentioned a case where the IC chip is used as a health insurance certificate and a medical service institution uses a mobile telephone which also serves as an IC chip-interrogator. When the soundness of the IC chip-attached health insurance certificate can be checked off-line, the determination of the soundness can be performed in the IC chip-interrogator mode rather than the mobile telephone mode. However, in the case where there is a fear that the health insurance certificate might be stolen, the mobile telephone which also serves as an IC chip-interrogator may be switched to the mobile telephone mode to make an inquiry to the center about whether the IC chip-attached health insurance certificate has been stolen. In this case, it is effective to install in the mobile telephone an application which, for example, enables to send automatically the information in the IC chip which is read in the IC chip-interrogator mode and stored in the store part for the information of IC chip 2530 by a specified key operation to make the inquire, and which enables to receive and display the result of the inquiry immediately. The mobile telephone which also serves as an IC chip-interrogator is also very convenient on the part of a use of the IC chip. For example, it becomes possible for a user to automatically inquire about the contents of a service of which the user has the membership based on the information in the IC chip of the IC chip-attached health insurance certificate, or to obtain the service on-line using the IC chip as a certificate. In this case, it is also effective to install in the mobile telephone an application which, for example, enables to send automatically to a desired facility to execute service the information of the IC chip which is read in the IC chip-interrogator mode and stored in the store part for the information of IC chip 2530 by a specified key operation to make the inquire, enables to receive and display the result of the inquiry immediately, enables to automatically connect to a desired facility of service to send the information in the IC chip thereto and enables the shift the mode to a mode through which the service can be obtained in this state.

In addition, when writing of information into the IC chip is required, the information to be written may be stored in the store part for information of IC chip 2530, then the mode may be shifted to an IC chip-interrogator mode, and the information stored in the store part for information of IC chip 2530 may be written in the IC chip. According to the present embodiment, the addition of the IC chip-interrogator function to a mobile telephone has advantages that the mobile telephone can also serve as the antenna 2404, the key 2410 and the screen 2408, and that the IC chip-interrogator can be prepared at low cost. As an application example of the IC chip, the IC chip-interrogator mode may be combined with the mobile telephone mode so that the information can be shared by the both modes, whereby the application range of the IC chip can become widen and the IC chip becomes more convenient.

The benefit from combining the IC chip-interrogator and the mobile telephone on the part of a facility to execute service which provides a service will be described in the following, taking an medical insurance using an IC chip as a medical insurance certificate as an example. In a facility to execute medical service, a command to retrieve the insurance certificate number, information about a user or information about the diagnosis is sent to an IC chip of an owner of the IC chip in the IC chip-interrogator mode, and the user information or diagnostic information is retrieved from the IC chip and displayed on a screen of the interrogator. If any problem is found in the user information, the mode may be shifted to a mobile telephone mode, and an inquiry about whether the insurance certificate is stolen may be made to the center. In this case, since the shift between the IC chip-interrogator mode and the mobile telephone mode can be performed easily and the store part for information of IC chip can be used in the both modes, the necessity of re-storing of the user information or the like is eliminated and an effective inquiring becomes possible. In addition, by storing diagnostic information into the store part for the memory of the IC chip and checking the information, it becomes possible to confirm whether the user has other diagnostic history or the like. After the user has been diagnosed, the contents of the treatment may be recorded in the diagnostic information which is stored in the IC chip in the IC chip-interrogator mode.

Figure 26:
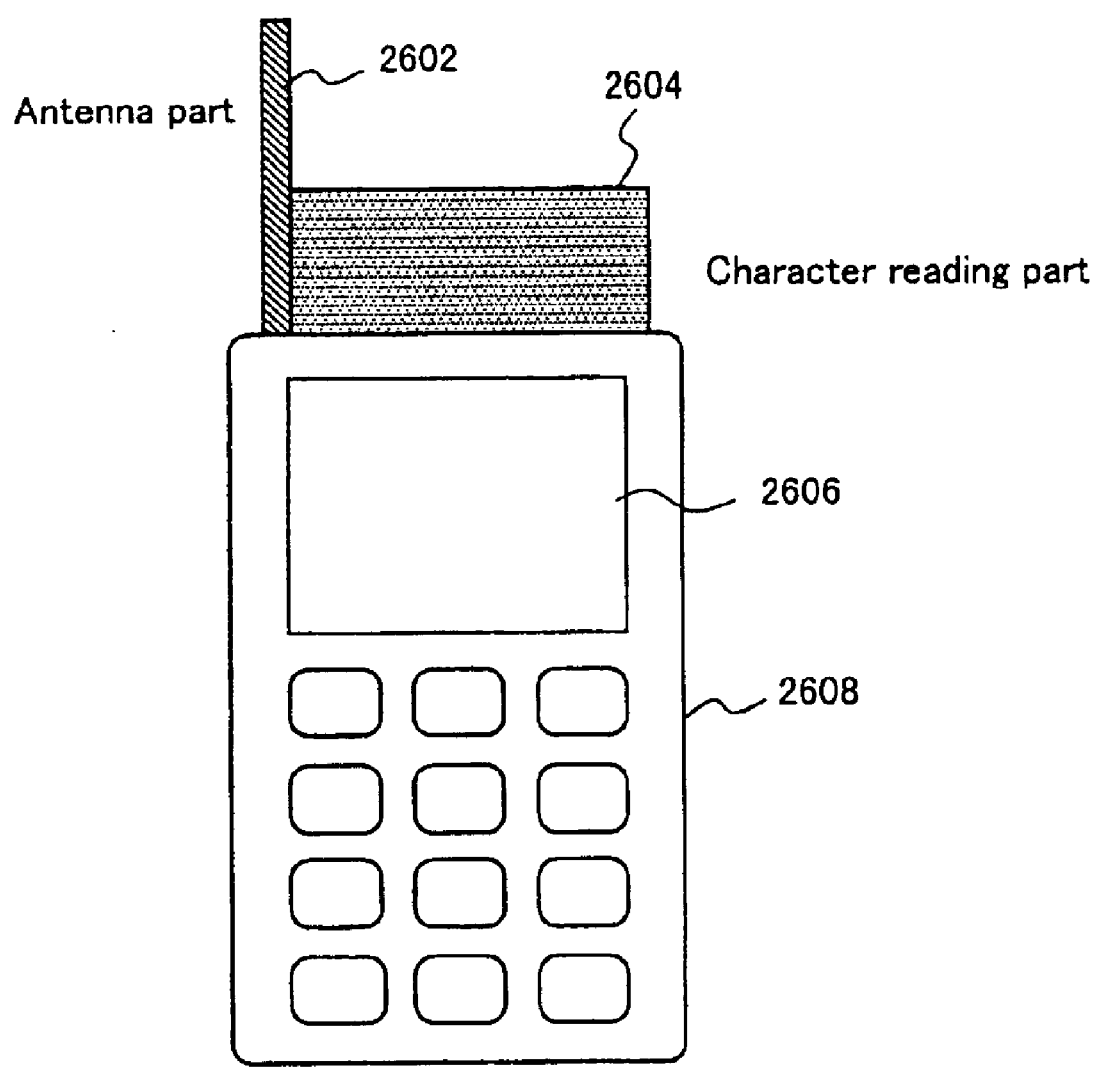
FIG. 26 shows an appearance of an embodiment of an interrogator for IC chip which also serves as a character information reader.

The embodiment of the method for improving the reliability of the soundness determination of an IC chip-attached certificate using both information in the IC chip and information printed on the surface of the certificate is as described above. The method can be made more convenient by using an interrogator which can read both the information in the IC chip and the information printed on the surface of the certificate simultaneously. FIG. 26 shows an embodiment of the IC chip-interrogator which also serves as a character information reader. The information in the IC chip is read by the communication via an antenna 2602, and the information printed on the surface of the certificate is read by a character information reading part 2604. The character information reading part 2604 is composed of a scanner which optically reads a character and a character recognition part which converts the optically read character into a code. In this way, for example, information in an IC chip 1810 attached on an IC chip-attached certificate 1802 as shown in FIG. 18 and two pieces of character information 1808 and 1804 printed on the surface of the certificate can be read simultaneously. Even when a bar code is used as a printed information in place of a character, the bar code can also be read by the character reading part 2604.

Figure 27:
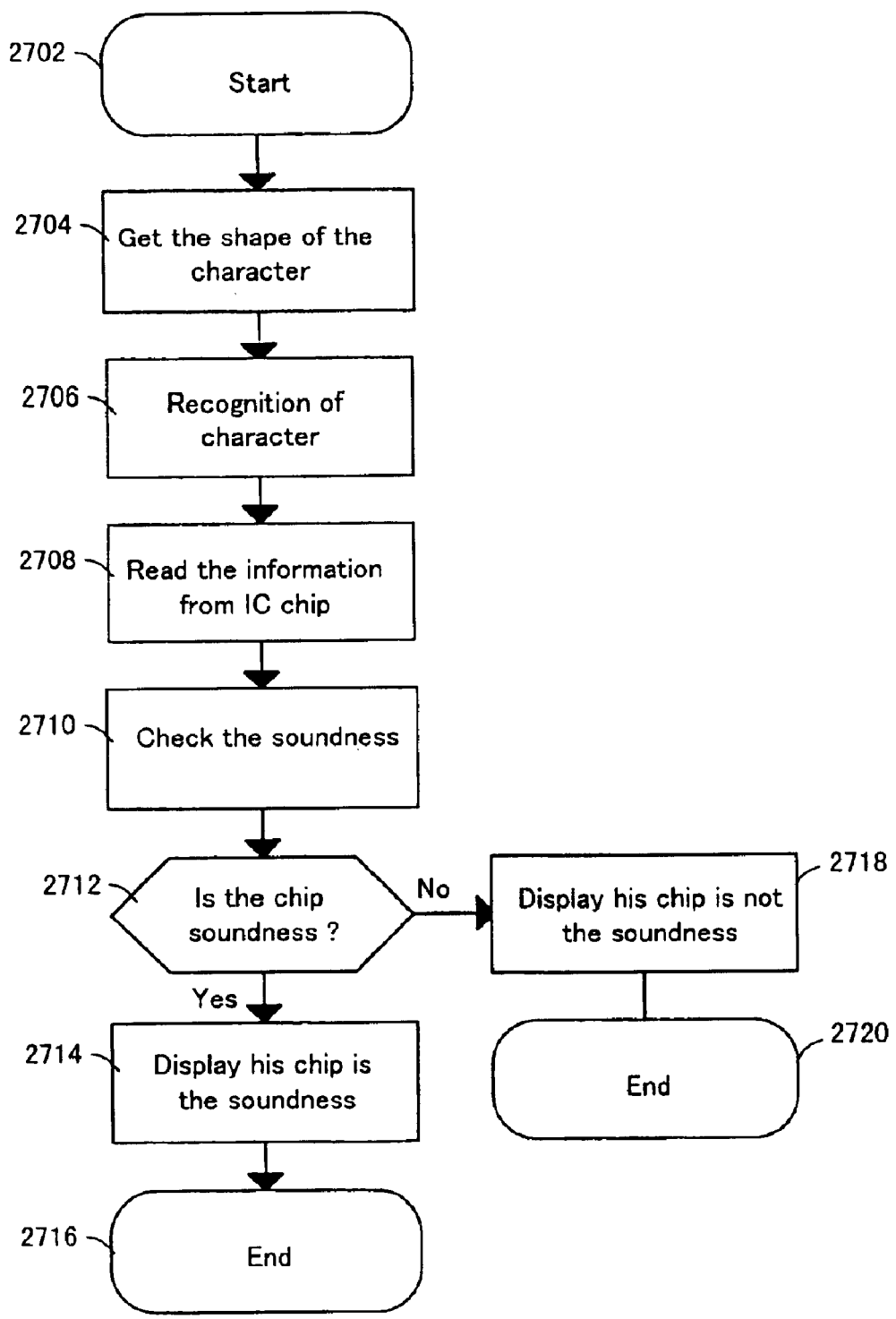
FIG. 27 is a flow chart of an embodiment of the processing procedure of an interrogator for IC chip which also serves as a character information reader.

In the IC chip-interrogator which also serves as a character information reader 2608, in addition to reading the information in the IC chip and the information (e.g., a character) printed on the surface of the certificate, it is also possible to perform a processing for checking the soundness of the certificate. The procedure of the processing is shown in the flow chart of FIG. 27. A character printed on the surface of the certificate is read by a character information reading part 2604 (2704), and the read character is recognized (2705). Thereafter, the information in the IC chip is read through the antenna 2604 using the function as the IC chip-interrogator (2708). The soundness of the certificate is then checked using the content read by the character information reading part 2604 and the information in the IC chip (2710) to determine whether the certificate is sound or unsound (2712). If sound, a mark indicating "soundness" is displayed on a screen 2606 (2714), whereas if unsound, a mark indicating "unsoundness" is displayed on the screen 2606 (2718). The specific processing method for the determination of soundness depends on the type of the certificate to be checked. One example of the method involves to verify the content of the IC chip against the content read from the character information to determine whether the both contents are identical or not. To improve the reliability of the determination of soundness, there may be employed the "method for confirmation of soundness using information in IC chip and information printed on certificate" as described above.

Here, an example of the utilization of a digital signature printed on the surface of the certificate will be described. In the embodiment shown in FIG. 18, the character 1808 is information of a digital signature. The character 1808 is a value "y" determined according to equation (8).

$$y=(x1+x2)^{**}d \bmod n \qquad (8)$$

In equation (8), "d" and "n" represent secret keys of a facility which issues the certificate. That is, since the determination of "y" uses secret keys which must be never leaked to the outside, the determination of "y" can be performed in a safe situation. The result of the determination is printed on the certificate. "x1" represents information in the IC chip, and "x2" represents important information (e.g., a face value of a paper money; in FIG. 18, "1,000 yen") printed on the surface of the certificate. After reading "y", a calculation according to equation (9) is performed in the IC chip-interrogator which also serves as a character information reader 2608.

$$z=y^{**}e \bmod n \qquad (9)$$

The result "z" corresponds to (x1+x2) in equation (8), namely the information about the IC chip and the information of the face value information. Then, the content of the IC chip is read, and the resulting information of the IC chip is subtracted from "z". As a result, a face value information "x2" can be produced.

$$x2=z-x1 \qquad (10)$$

When the value "x2" is identical to the face value printed on the surface of the certificate, the soundness of the certificate 1802 is recognized. Alternatively, a visual comparison may be made between the value displayed on the screen 2606 of the IC chip-interrogator which also serves as a character information reader 2608 with the face value information printed on the surface of the certificate to determine whether the resulting value is identical to the face value information.

As mentioned above, by attaching an IC chip to a certification, it becomes possible to confirm the soundness of the certificate only through an IC chip and to reduce to a great extent the possibility of counterfeiting of a certificate which is produced using printing technology and, therefore, for which little countermeasures are taken against the counterfeiting. Such an IC chip-attached certificate is applicable as a simplified insurance certificate or a passenger ticket. For example, when a person has a simplified non-life traveling insurance certificate issued by a convenience store, a sophisticated printing technology may not be applied to the issue of a certificate in the convenience store, and a conventional printing technology may not be good enough to prevent the counterfeiting. In such a case, the use of an IC chip in a certificate can make the counterfeiting of the certificate difficult. An embodiment of an apparatus for issuing an IC chip-attached certificate readily is shown in FIG. 28.

Figure 28:
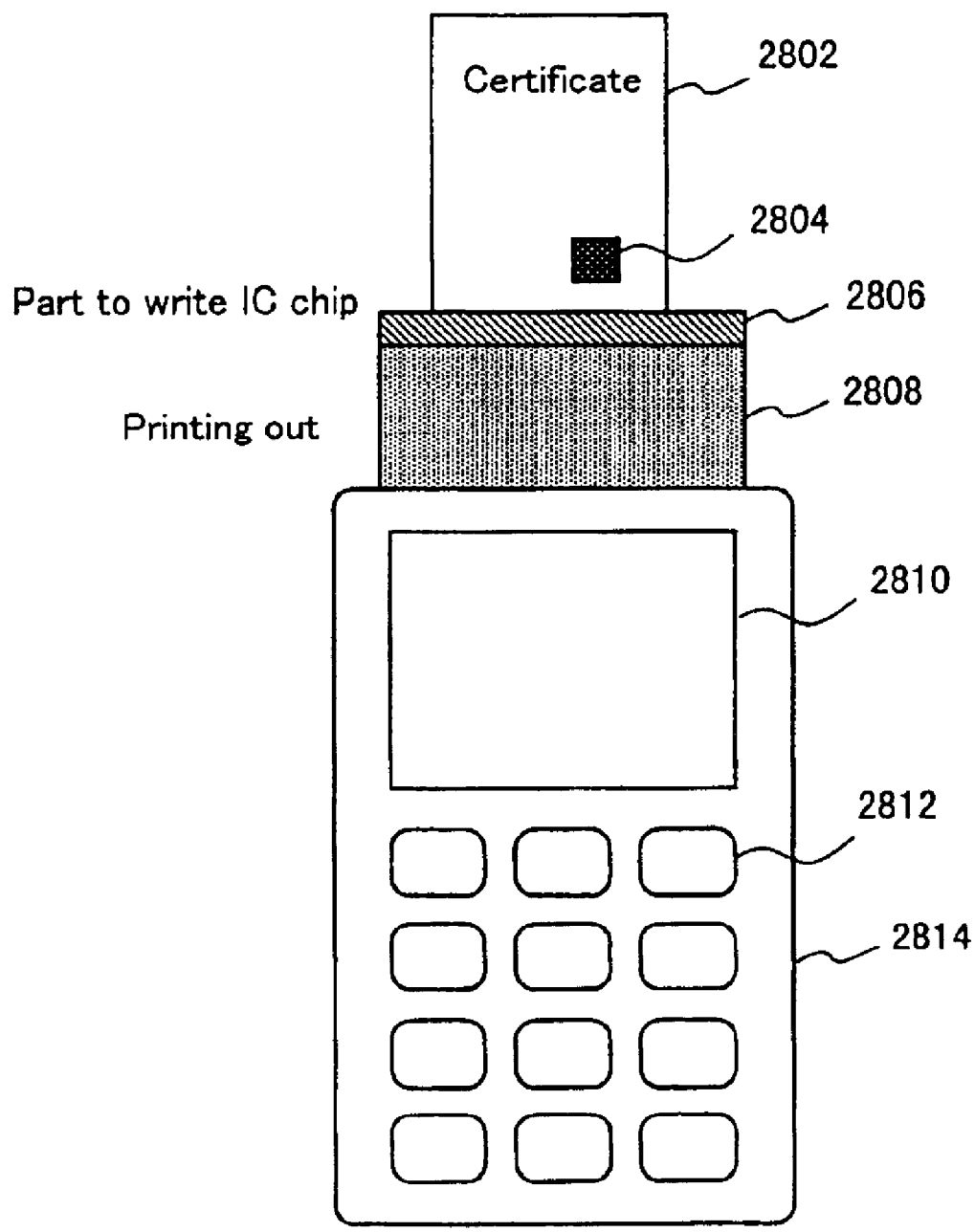
FIG. 28 shows an appearance of an embodiment of a simplified certificate-issuing apparatus.

FIG. 28 is a schematic illustration of an embodiment of an simplified certificate-issuing apparatus according to the present invention. In the simplified certificate-issuing apparatus 2814, a plurality of IC chip-attached certificates in which a portion of the information of the certificate is not printed and which are provided as sheets of paper or a roll paper are accommodated in a certificate paper-accommodating part, and required information is printed on a certificate by a printing part 2808. Since the certificate 2802 produced in this manner has an IC chip 2804 therein, it cannot be counterfeited by only printing technology, and the counterfeiting is made difficult. The information needed for the printing or the like may be input with a key 2812.

In this embodiment, there are some methods for making the counterfeiting of an IC chip-attached certificate more difficult. One of the methods is to use a writable IC chip to store the content printed by the simplified certificate-issuing apparatus 2814 as the information in the IC chip. When a writable IC chip in which only one-time writing is possible is used, the writing can be performed without the use of a key of cryptograph. If a writable IC chip in which the writing can be made several times is used, it is needed to prevent a fraudulent modification of the information to be written by using a key of cryptograph. The writing into the IC chip is performed in by a part to write on IC chip 2806 during printing. For the confirmation of the soundness of the certificate, the comparison is made between the information printed on the surface of the certificate and the information stored in the IC chip. If the both information contents are identical to each other, the certificate can be recognized to be sound.

Alternatively, a method may be employed in which the information in the IC chip and information to be printed are combined. According to this method, an IC chip-attached certificate as shown in FIG. 19 or 22 is issued by the simplified certificate-issuing apparatus 2814. That is, the "method for confirmation of soundness using information of IC chip and information printed on certificate" using the combination of the information in the IC chip and the important information printed on the certificate, is employed to generate a digital signature corresponding to the both information contents by the simplified certificate-issuing apparatus 2814 and to print the digital signature on the certificate. If it is dangerous to store a secret key in the simplified certificate-issuing apparatus 2814, the simplified certificate-issuing apparatus 2814 may be connected to a facility to issue certificate (i.e., a facility of service) on-line to send the information in the IC chip and the important information about the certificate to the facility to issue certificate, a digital signature corresponding to the combination of the both information contents is calculated in the facility to issue certificate, the digital signature is re-sent to the simplified certificate-issuing apparatus 2814, and the digital signature is printed on the certificate in the simplified certificate-issuing apparatus 2814.

Figure 29:
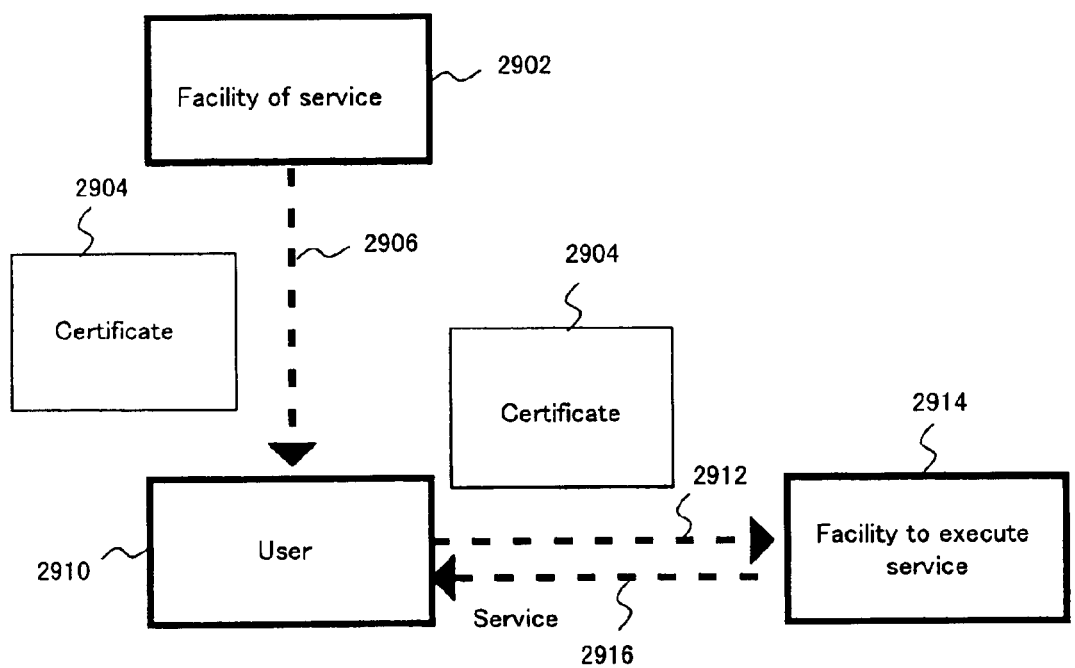
FIG. 29 illustrates an embodiment of a service system using a certificate.

A service which can be provided using a certificate includes, for example, a life insurance, a non-life insurance, a health insurance (i.e., medical insurance), a merchandise coupon, a stock certificate, a paper money, a cinema ticket and a passenger ticket. The general flow of the service using a certificate is shown in FIG. 29. A facility of service 2902 issues a certificate 2904, a user 2910 receives the certificate 2904 (2906). The user 2910 sometimes pays compensation (e.g., money) to the facility of service 2902. When intended to obtain the service, the user 2910 who receives the certificate 2904 presents or transfers the certificate 2904 to a facility to execute service 2914 (2912) to obtain the service (2916). The facility of service 2902 and the facility to execute service 2914 may be same as or different from each other. For example, an example of a service of which the facility of service and the facility to execute service are different is a health insurance. The facility of service of health insurance is a health insurance society which issues a health insurance certificate, and the service of the health insurance is provided by a facility to execute service (e.g., a hospital). In the case where the facility of service and the facility to execute service are different from each other, some compensation is usually paid between the both facilities. On the other hand, a transport service by a facility of transportation using a passenger ticket or the like is an example of the service of which the facility of service and the facility to execute service is the same.

In a service using a certificate, a service system comprising a facility of service 2902, a user 2910 and a facility to execute service 2914 can function safely on the precondition that a certificate is sound. However, if there is a possibility of counterfeiting of a certificate, it is necessary to verify the user 2910 by a means other than the certificate. Therefore, the operation cost of the system may be increased and, in extreme cases, the service system itself may fail. The IC chip-attached certificate according to the embodiment of the present invention is difficult to counterfeit more than ever, and therefore serves to prevent the failure of the service system which may be caused by the counterfeiting of the certificate and to reduce the operation cost of the entire system.

Figure 30:
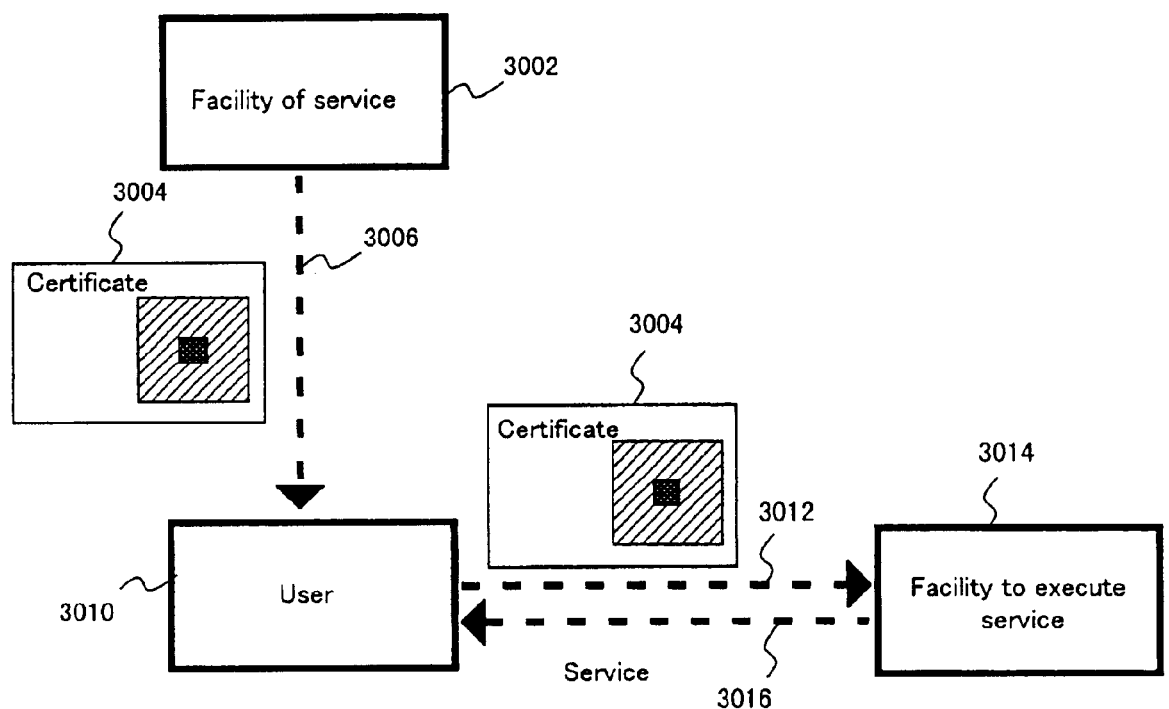
FIG. 30 illustrates an embodiment of a service system using an IC chip-attached certificate.

An embodiment of a service system using an IC chip-attached certificate according to the embodiment of the present invention is shown in FIG. 30. A facility of service 3002 issues to a user 3010 an IC chip-attached certificate 3004 having an IC chip therein in place of a conventional certificate 2904 (3006). The user 3010 presents or transfers the IC chip-attached certificate 3004 to a facility to execute service 3014 (3012) to obtain the service (3016). In the facility to execute service 3014, the information in the IC chip is read using a mobile telephone 2406 which also serves as an IC chip interrogator as shown in FIG. 24 or an IC chip interrogator 2608 which also serves as a character information reader as shown in FIG. 26, and the soundness of the IC chip-attached certificate can be checked using the information in the IC chip or using both the information in the IC chip and the information printed on the certificate. According to this embodiment, by using an IC chip-attached certificate 3004, the counterfeiting of the certificate becomes more difficult compared with a conventional certificate for which a countermeasure against the counterfeiting is taken using printing technology, and therefore it becomes possible to reduce the possibility of failure of the service system which may be caused by the counterfeiting of the certificate and the operation cost of the system. The distribution of the IC chip-attached certificate to a user may be performed using a post card 2202 as shown in FIG. 22. As the information in the IC chip to be printed on the certificate without exception, there is mentioned an IC chip number which is unique to every individual IC chip or an IC chip number which indicates the facility which issues the certificate and is, therefore, identical among individual IC chips. The certificate may have thereon a field for recording other additional information (e.g., user information, status of use). Information on a facility of service may be recorded on the certificate. The additional information may be selected largely depending on the type or content of the service to be obtained. The determination of soundness of the certificate can be achieved by comparison between the information in the IC chip with the information printed on the certificate or by the "method for confirmation of soundness using information in IC chip and information printed on certificate" described above.

Figure 31:
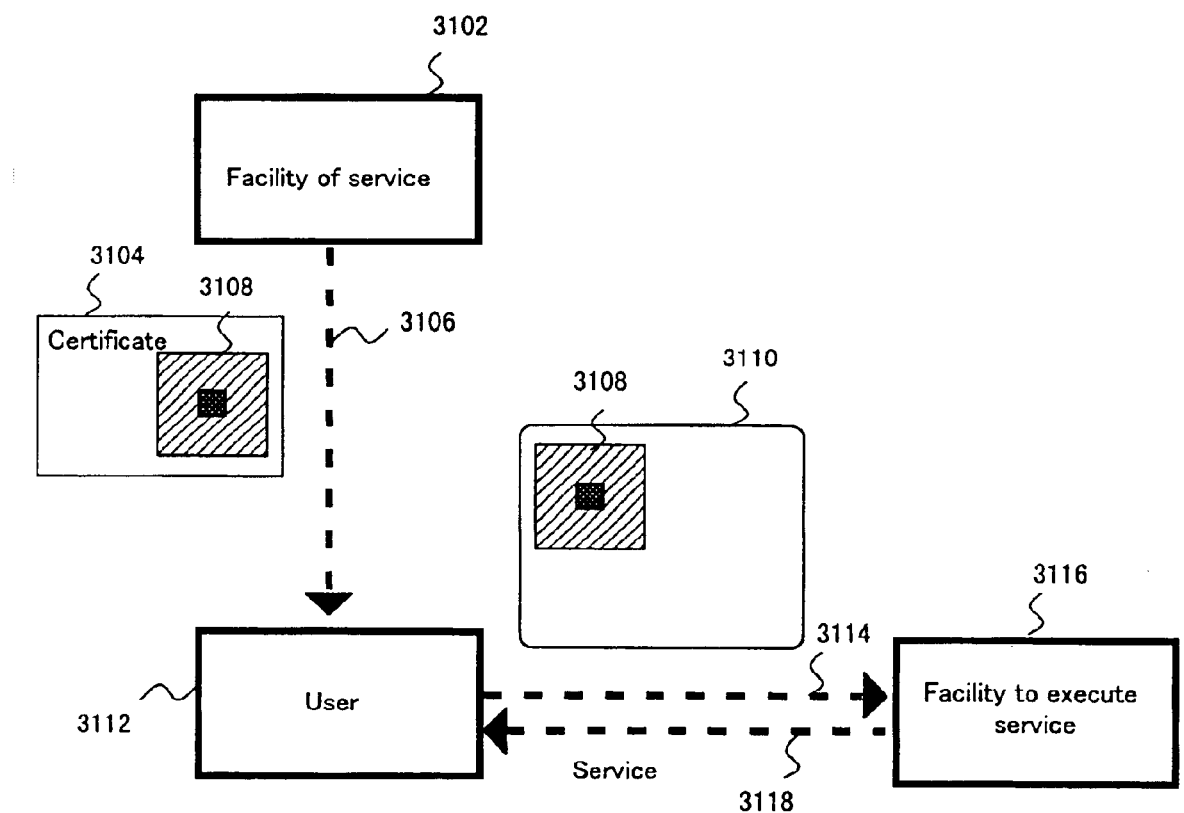
FIG. 31 illustrates another embodiment of a service system using an IC chip-attached seal.

It is also possible to obtain a service using an IC chip-attached seal, rather than using an IC chip-attached certificate directly. An embodiment of a service system using an IC chip-attached seal is shown in FIG. 31. A facility of service 3102 distributes an IC chip-attached seal 3108 to a user 3112 (3106). The distribution may be performed by directly sticking the IC chip-attached seal 3108 on the certificate 3104 in the manner as shown in FIG. 23 and the IC chip-attached seal 3108 is distributed together with the certificate 3104. When the service is to be obtained using only the IC chip-attached seal, the IC chip-attached seal may be removed from the certificate, or an IC chip-attached seal may be distributed in addition to the IC chip-attached certificate. Alternatively, an IC chip-attached seal 3108 may be distributed using a post card as shown in FIG. 21. The user 3112 who receives the IC chip-attached seal 3108 sticks it on a mount for IC chip-attached seal 3110 or the like, and presents it to a facility to execute service 3116 (3114) to obtain the service (3118).

Figure 32:
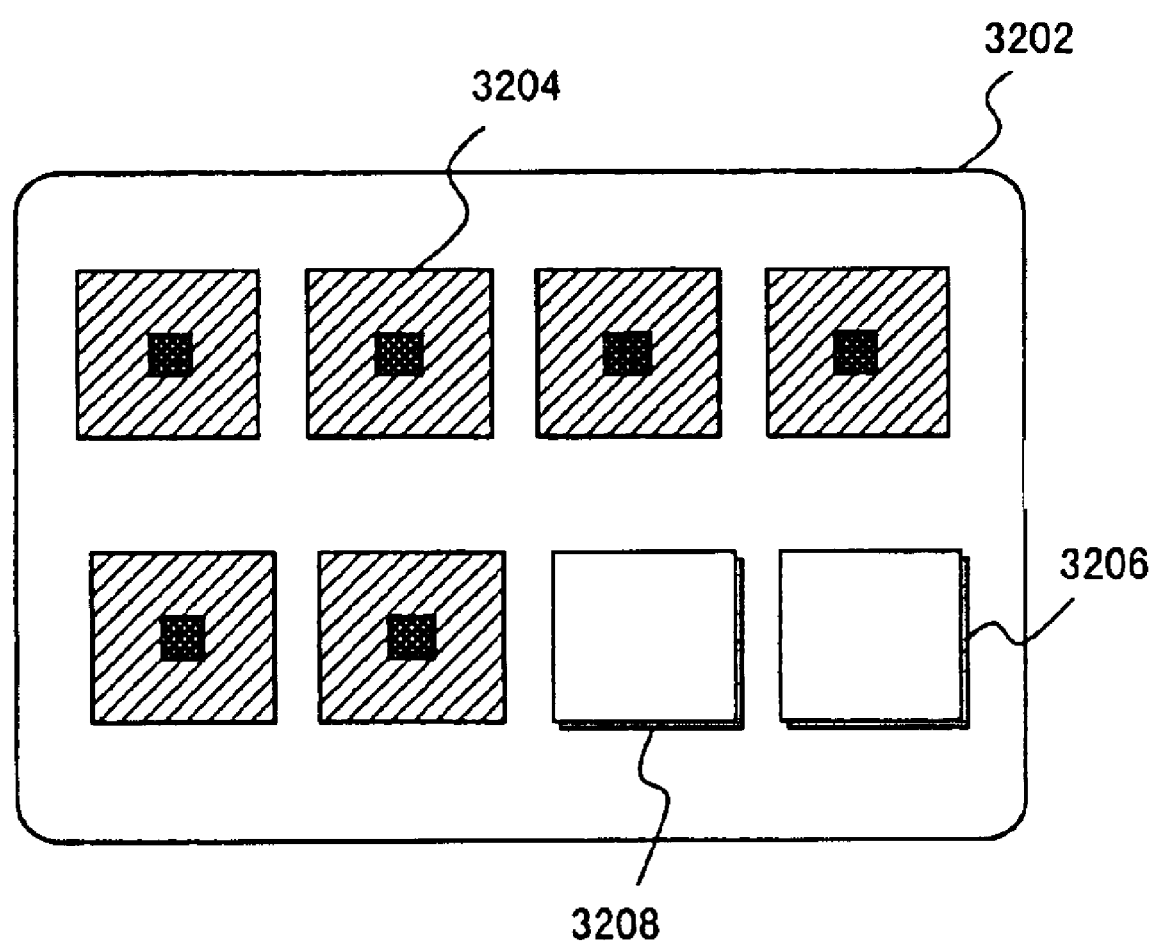
FIG. 32 shows an appearance of an embodiment of a mount on which an IC chip-attached seal to be attached.

If a service system using an IC chip-attached seal becomes widespread, a user would have a plurality of IC chip-attached seals. The use of a standardized mount will make this system more convenient for a user. An embodiment of the mount is shown in FIG. 32. Assume that each IC chip-attached seal has a standardized size. A mount 3202 has thereon grooves 3206 and 3208 each of which fits to the standardized size of the IC chip-attached seal 3204 so that the seal can be placed on the mount 3202 readily and is resistant to peeling off.

Figure 33:
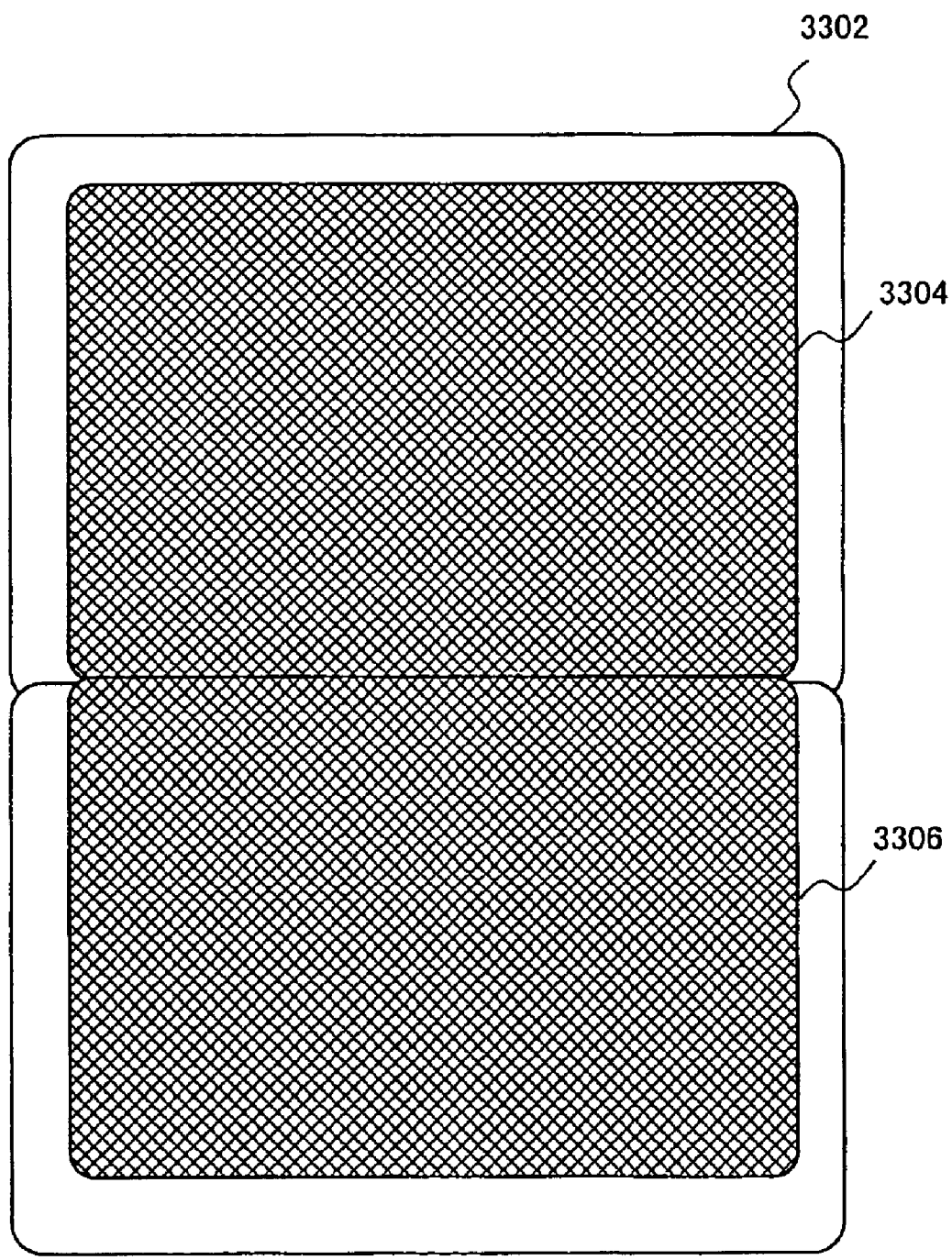
FIG. 33 shows an embodiment of a card case which can prevent the reading out of the content of an IC chip from the outside.

If the opportunity to carry the IC chip-attached seal or certificate is increased, a countermeasure for preventing the reading out of the information of the IC chip by another person is needed. It is generally assumed that the IC chip-attached seal or certificate is protected by a card case (e.g., a commuter pass case) which is usually put in a breast pocket or the like. For example, in a crowded train, there is a risk that a strong interrogator is put on the breast pocket to read the information of the IC chip. An embodiment of a card case for preventing this risk is shown in FIG. 33, which illustrates the state where the card case is opened. In a card case 3302, metal films (e.g., aluminum films) 3304 and 3306 are provided on its inside face to shield external electromagnetic waves and radio waves. Due to this function of the metal films, fraud reading out from or writing on the IC chip-attached seal 3204 held in the card case 3302 can be prevented.

Figure 34:
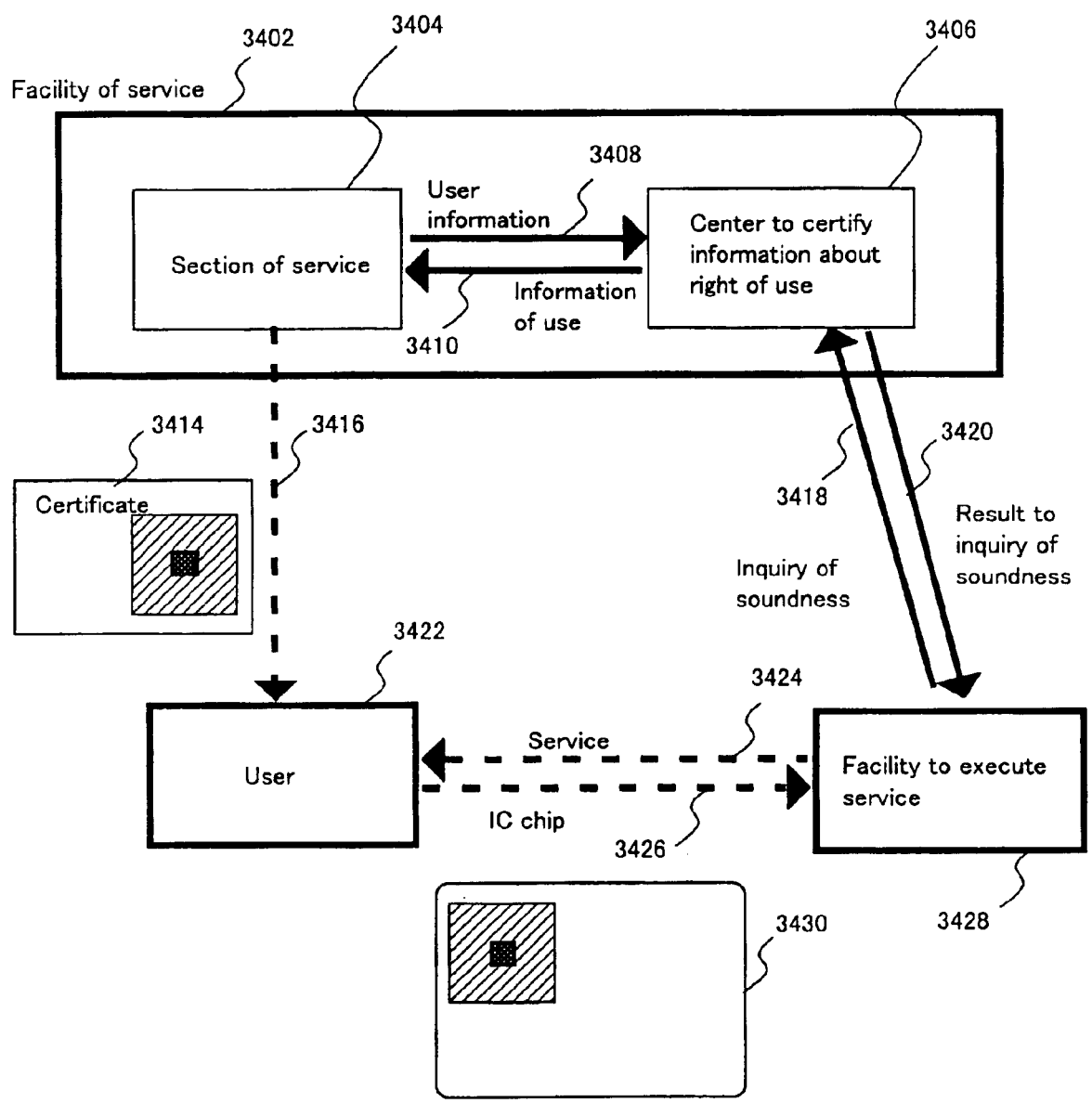
FIG. 34 illustrates an embodiment of a service system in which the confirmation of soundness of an IC chip is performed in a center to certify information about right of use.

To further improve the confirmation accuracy for the soundness of an IC chip-attached certificate, there may be employed a method in which the information of the IC chip is inquired to a facility of service when the service is executed. An embodiment of a service system which achieves the method is shown in FIG. 34. Here, the overall flow of the system is explained. For the execution of a service for a user 3422 (3424), a facility to execute service 3428 asks the user 3422 to present or transfer an IC chip-attached seal or certificate 3430 (3426). The facility to execute service 3428 sends the information in the IC chip or the information printed on the seal or certificate to a center to certify information about right of use 3406 which associates with a facility of service 3402 and makes an inquiry about the soundness of the certificate (33418). To the center to certify information about right of use 3406, information about right of use 3502 given using the IC chip (see FIG. 35) is transferred from a section of service 3404 in the facility of service 3404 in advance (3408).

Each of the facility of service 3402, the section of service 3404 and the center to certify information about right of use 3406 in the facility of service 3402, and the facility to execute service 3428 shown in FIG. 34 has a computer system. The computer systems of these facilities are interconnected via a leased circuit, a public circuit, an internet or the like. With respect to the facility to execute the service 3428, however, it may have a system configuration in which a mobile telephone which also serves as an IC chip interrogator is equipped rather than a computer system and it is connected to the facility of service 3402 via a public circuit of the mobile telephone which also serves as an IC chip interrogator to exchange information therebetween. In FIG. 34, dotted arrows represent a relation in provision of a product or service, and solid arrows represent the flows of communication statements or data among the computers installed in the above-mentioned facilities and centers. In other figures which also show system configurations of service systems, dotted and solid arrows have the same meanings.

Examples of information 3502 which is stored in and managed by a server of the center to certify information about right of use 3406 include an IC chip number 3503, user information 3506 and the content of service 3510, as shown in FIG. 35. Information to check soundness 3508 is also sent from the section of service 3404 to the center to certify information about right of use 3406. The information to check soundness 3508 includes a method or information for the confirmation of the soundness using the combination of the information in the IC chip and the information printed on the seal or certificate. As the method for confirming the soundness, there may be mentioned the following methods.

(1) Method for confirming the IC chip registration

A method in which the soundness is checked using an IC chip number 3504 by confirming whether the registration of the IC chip number sent from a facility to execute service 3428 is made.

(2) Method for confirming the IC chip registration and validity of IC chip

A method in which the soundness is checked using an IC chip number 3504, by confirming whether the registration of the IC chip number sent from a facility to execute service 3428 is made and then confirming whether the date when the IC chip is used falls within the term of validity 3514.

(3) Method for confirming the status of use and the registration of IC chip

A method in which the soundness is determined using an IC chip number 3504, by confirming whether the registration of the IC chip number sent from a facility to execute service 3428 is made and then confirming whether the IC chip is valid to use by using the information of the status of use 3514. In the case where the certificate is a merchandize coupon or a ticket, when the certificate is once used, it is flagged "used" in the item "status of use" 3512. If an inquiry is made about the flagged IC chip number by a facility to execute service, it is judged as a "double inquiry" and recognized as a "fraud use".

(4) Confirmation method using IC chip registration and information printed on the surface That is, the "method for confirmation of soundness using information in IC chip and information printed on certificate" described above. In the information to check soundness 3508, a public key for verifying a digital signature is stored.

In the center to certify information about right of use 3406, the determination of soundness is performed using information sent from a facility to execute service 3428 accompanied with the inquiry about soundness, based on the information to check soundness 3508. The information sent from the facility to execute service 3428 depends on the soundness confirmation method which is employed in the service system, but an IC chip number is always necessary. The center to certify information about right of use 3406 can report the status of use 3512 (e.g., inquiry information from the facility to execute service 3428) to the section of service 3404 (3410).

Figure 36:
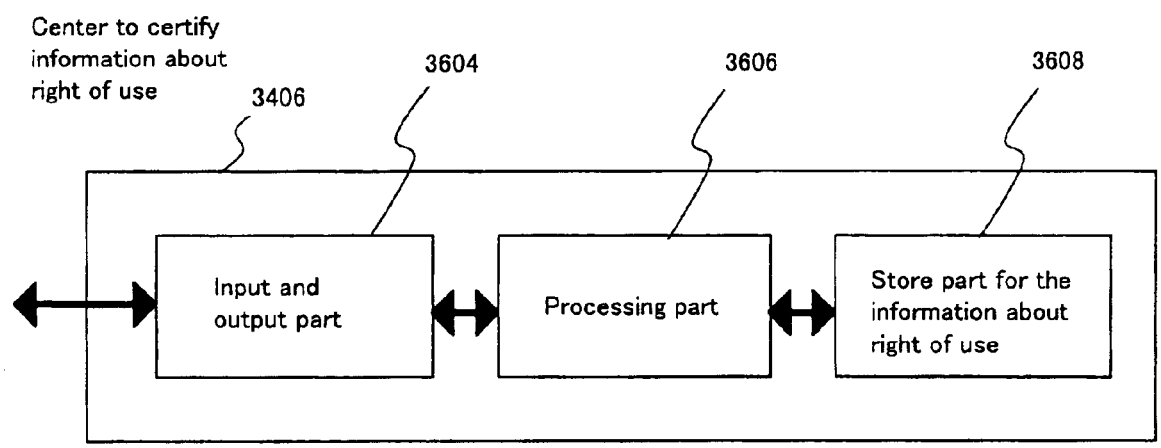
FIG. 36 illustrates the configuration of an embodiment of a center to certify information about right of use or an agency for service center.

An embodiment of the function of a computer system provided to the center to certify information about right of use 3406 is shown in FIG. 36. The inquiry from a section of service or a facility to execute service is received by an input/output part 3604, and then processed in a processing part 3606 using the information about right of use 3502 which is stored in the store part for information about right of use 3608.

A simplified method for the determination of soundness is an IC chip registration confirmation method of item (1) above, in which it is checked whether the information of IC chip 3504 stored in the store part for the information about right of use 3608 of the center to certify information about right of use 3406 is identical with the information of IC chip sent from the facility to execute service 3428. If identical, it is recognized as "sound", whereas if not, it is recognized as "unsound".

To improve the reliability of the soundness determination, there may be employed a method in which the soundness is determined using the combination of the information in the IC chip and the information printed on the seal or certificate by the "method for confirmation of soundness using information in IC chip and information printed on certificate" described above. When a public key cryptosystem is employed, a public key is stored as the information to check soundness 3508 in the information about right of use 3502. The soundness can be determined by decrypting the information in the IC chip sent from the facility of service and verifying the decrypted information against the information printed on the certificate. In this case, it is also possible to confirm the correspondence between the IC chip and the seal or certificate on which the IC chip is attached.

Figure 37:
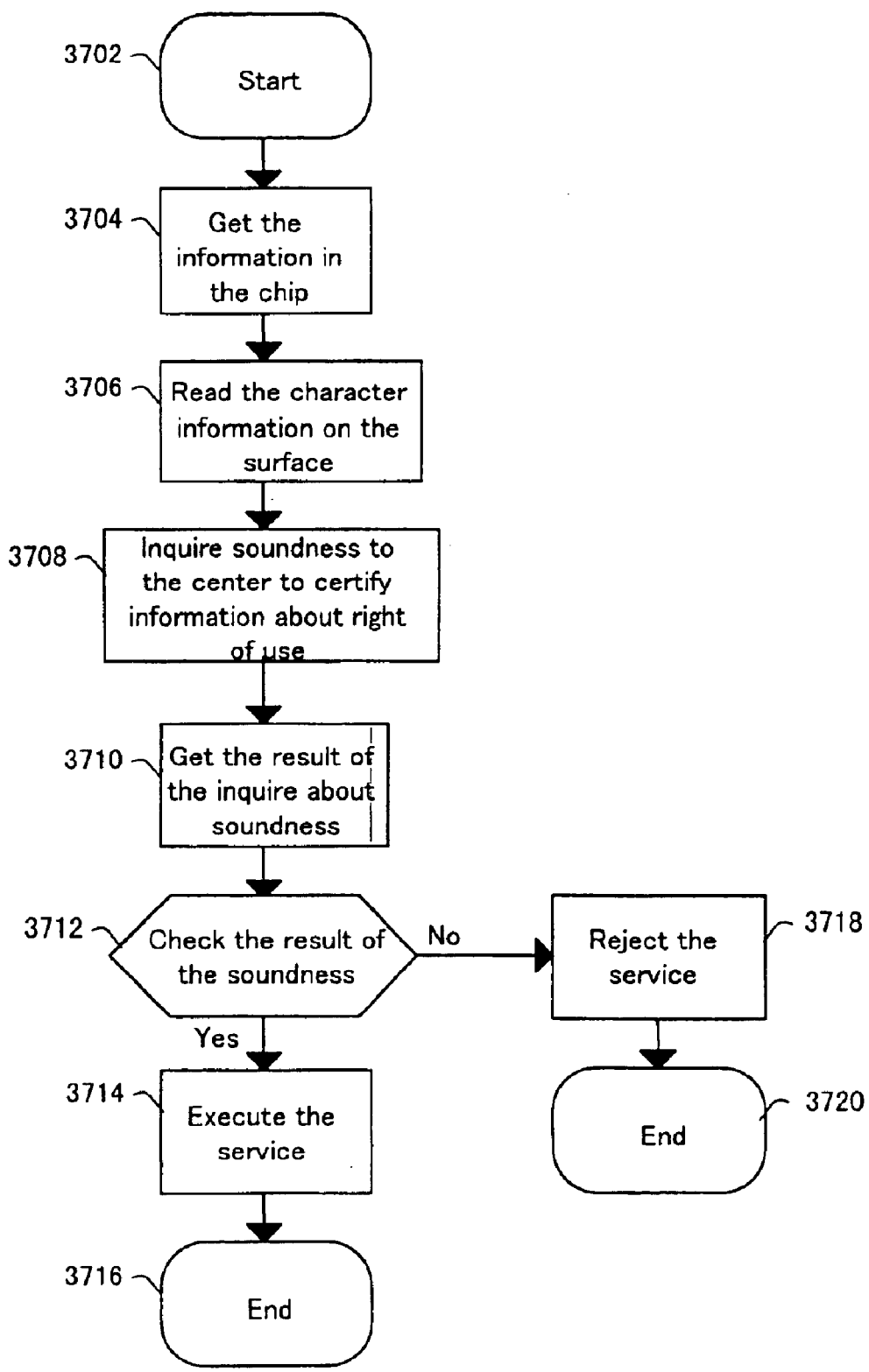
FIG. 37 is a flow chart of an embodiment of a processing procedure performed in a facility to execute service.
Figure 38:
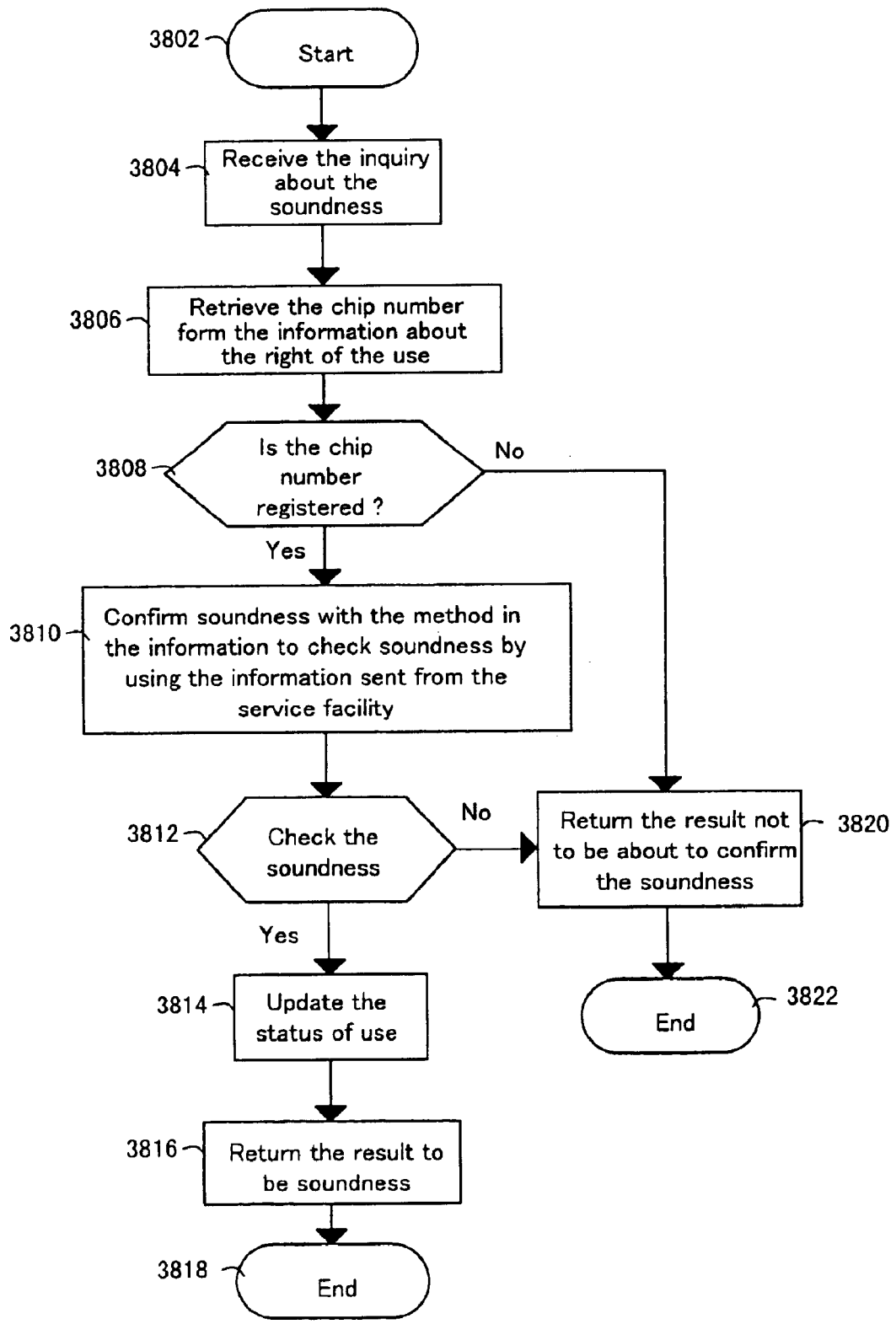
FIG. 38 is a flow chart of an embodiment of a processing procedure for determination of soundness performed in a processing part of a center to certify information about right of use.

An embodiment of the processing procedure for checking soundness performed in a facility to execute service 3428 is shown in FIG. 37. Upon receiving an IC chip-attached certificate or seal presented by a user, the facility to execute service 3428 reads the content of the IC chip using the above-mentioned interrogator (3704), reads the character information printed on the surface (3706) if necessary, and then sent the read information to a center to certify information about right of use 3406 to make an inquiry about soundness. The facility to execute service 3428 receives the result of the soundness determination from the center to certify information about right of use 3406 (3710). If it is recognized to be sound, the service is executed (3714). Whereas, if it is recognized to be unsound, the service is rejected (3718).

An embodiment of the processing procedure for checking soundness performed in the processing part 3606 of the certify information about right of use 3406 is shown in FUG. 38. Upon receiving a request for checking soundness from a facility to execute service 3428 (3804), the information about right of use 3502 (see FIG. 35) which is stored in the store part for information about right of use 3608 is searched for the IC chip number which is sent together with the request which is stored in a memory for the information about right of use 3608 (3806). When the IC chip number is not found, a result that "the soundness is not certified" is returned (3820). When the IC chip number is found, the soundness is confirmed using the confirmation method written in the information to check soundness 3508 and the information to check soundness (3810). When certified, then the information about status of use 3512 is updated (3814), and a result that "it is sound" is returned to the facility to execute service 3428 (3816). In contrast, when the soundness is not certified, a result that "the soundness is not certified" is returned to the facility to execute service 3428 (3820).

Figure 39:
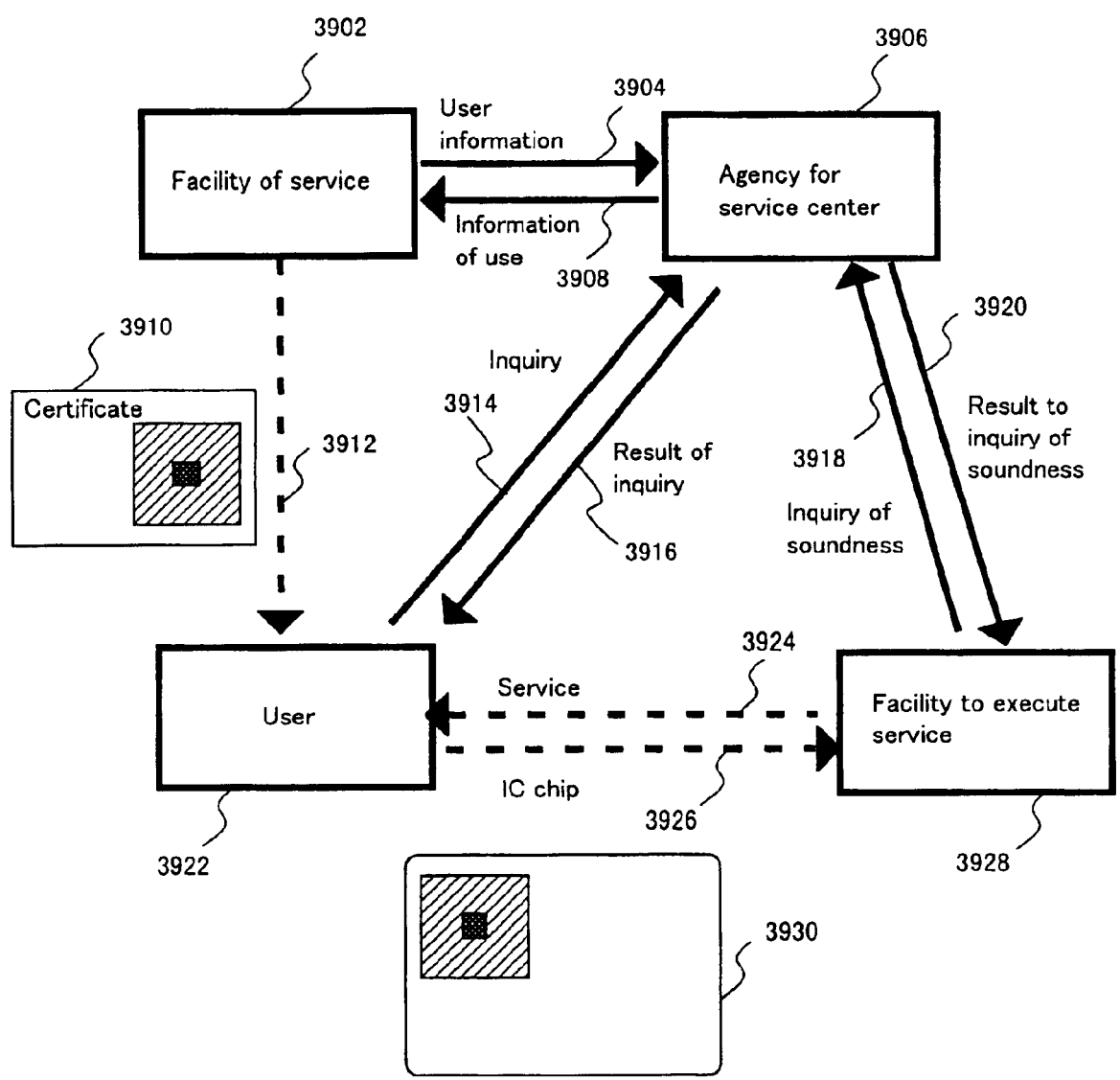
FIG. 39 illustrates an embodiment of a service system in which the confirmation of soundness of an IC chip is performed in an agency for service center.
Figure 40:
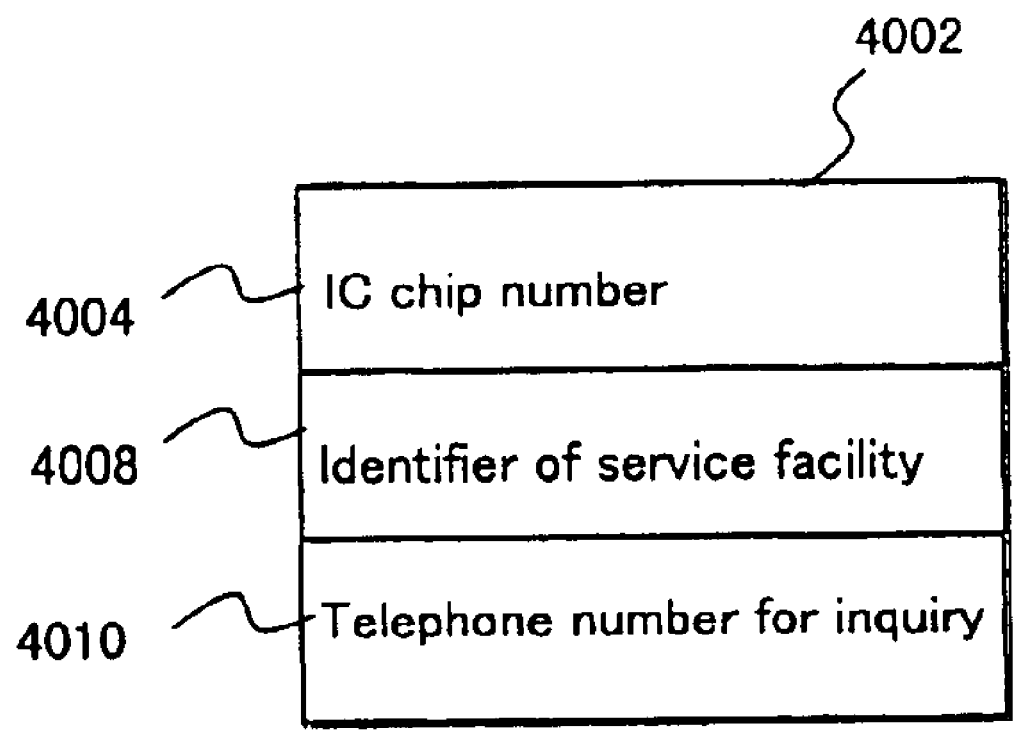
FIG. 40 shows examples of information to be stored in an IC chip.

If an IC chip-attached seal or certificate becomes widespread, then it would be convenient to establish an agency for service center which executes a processing for the center to certify information about right of use to verify the information of the IC chip. An embodiment of the relation among facilities in the service system including the agency for service center is shown in FIG. 39. The agency for service center 3906 executes for a center to certify information about right of use 3406 of at least one of the facilities of service 3902 (in the figure, only one facility of service is shown). The facility of service 3902 distributes an IC chip-attached seal or certificate 3910 to a user 3922 (3912). In parallel, the facility of service 3902 sends the information about right of use to the agency for service center 3906 (3904) from which the service is to be obtained. The user 3922 presents or transfers the IC chip-attached seal or certificate 3930 to the facility to execute service 3928 (3926). The facility to execute service 3928 makes an inquiry about the soundness to the agency for service center 3906 (rather than the facility of service 3902) to confirm the soundness of the IC chip-attached seal or certificate 3930 (3918). The agency for service center 3906 executes the processing for confirmation of soundness using the information sent from the facility to execute service 3928, and returns the.result to the facility to execute service 3928 (3920). When the IC chip-attached seal or certificate 3930 is sound, the facility to execute service 3928 provides the service (3924).

Assuming that a plurality of service systems are established by a plurality of facilities of service and a user possesses many kinds of IC chip-attached certificates. In this case, the procedure of the soundness-confirmation processing performed in the facility to execute service 3928 can be simplified by establishing an agency for service center 3906. This is because that the facility to execute service can inquire to one agency for service center 3906 for any of the facilities of service which issue the IC chip-attached certificates. That it, all of a plurality of pieces of information about right of use for a plurality of IC chip-attached certificates which a user possesses can be managed by an agency for service center 3906 collectively. Accordingly, when information that an IC chip-attached certificate for a certain service of a certain user is fraudulently used in any of the plurality of facilities to execute service is given, it becomes possible to execute a quick response to reject all of the services for the user thereafter. This system is effective for minimizing the damages, for example, when a mount having a plurality of IC chip-attached certificates placed thereon is stolen.

The agency for service center 3906 can reply to an inquiry about the content of a service as well as an inquiry about the soundness from a facility to execute service 3928. For example, an inquiry about the contents or the level of the service which has been registered for every individual user can be replied. For this purpose, it is required to sent information about the content of a service from a facility of service to an agency for service center in advance.

The agency for service center 3906 can reply to a user 3922 the reply to an inquiry about the service content or the like (3914) made by the user 3922 (3916). To prevent that any one can make an inquiry arbitrarily, the confirmation of whether the inquiry is made by a user himself can be performed using an IC chip number. The inquiry to an agency for service center 3906 may be made using a mobile telephone which also serves as an IC chip-interrogator as shown in FIG. 24. To make the inquiry about a service using a mobile telephone or the like ready, in addition to an IC chip number 4004, an identifier of service facility 4008 and a telephone number for inquiry of the agency for service center may be stored in a memory 4002 of the IC chip. The mobile telephone 2404 which also serves as an IC chip interrogator is put over the IC chip 2402 in the IC chip-interrogator mode, sends a command to inquire to the IC chip, and reads the IC chip number, the identifier of service facility and the telephone number for inquiry from the IC chip.

Figure 41:
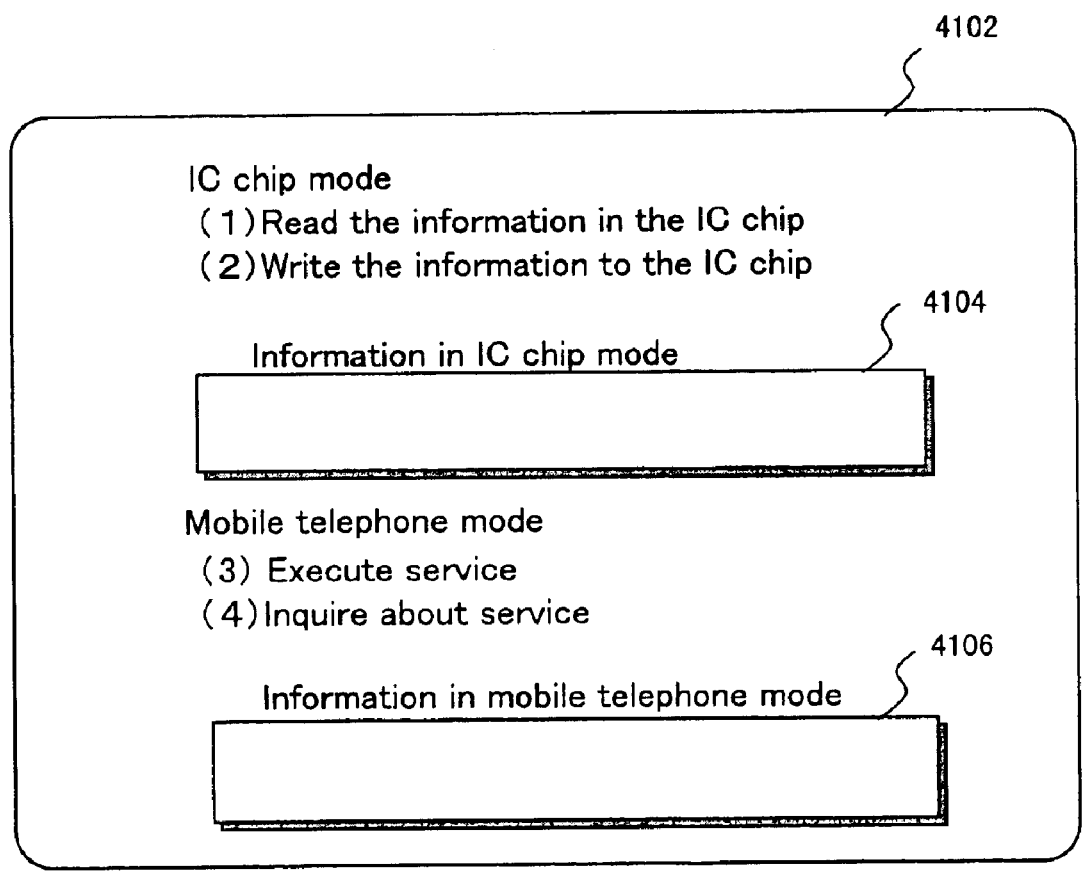
FIG. 41 shows an embodiment of a screen of a mobile telephone which also serves as an interrogator for IC chip.

FIG. 41 shows an embodiment of a display screen 4102 of a mobile telephone which also serves as an IC chip-interrogator. The mobile telephone which also serves as an IC chip-interrogator in which the mode is shifted to the IC chip-interrogator mode reads the information in the IC chip, and the read information is stored in the store part for information about IC chip 2530. The read information (e.g., information about a facility of service) is also displayed on a window for displaying information 4104 in the IC chip-interrogator mode. After reading the information in the IC chip, the mode is switched to the mobile telephone mode. When selecting the item "inquiry about service", an inquiry to an agency for service center is made automatically using information such as the telephone number of inquiry stored in the store part for information in IC chip 2530, and the result is displayed on the window for displaying information 4104 in the IC chip-interrogator mode.

To confirm the information about right of use for a plurality of facilities of service, the agency for service center 3906 stores and manages the information about right of use for the individual facilities of service 4202, 4214, . . . as shown in FIG. 42. One record starting from IC chip number 4204 (4216) is data sent from the facility of service and corresponds to one IC chip. The IC chip number 4204 (4216) is an identification code of an IC chip for which the facility of service executes the service. That is, the fact that IC chip numbers are registered for two pieces of information about right of use 4202 and 4214 means that the IC chips having these IC chip numbers are valid for receiving the services. The user information 4206 (4218) is information about a user, such as a name of the user. The information to be sent to an agency for service center is selected depending on the service to be obtained and a policy of each facility of service. In the information to check soundness 4208 (4220), there are described a method for checking soundness using the combination of information in IC chip and information printed on a certificate and information to be used for the check. For example, when a public key cryptosystem is employed, the pubic key is stored. The content of service 4210 (4222) is used for informing the content of a service to facility to execute service 3928 and a user 3922. The status of use 4212 (4224) is a field in which information about the status of use of an IC chip-attached seal or certificate is stored after checking the soundness. For example, in the case of a merchandise coupon, in an IC chip-attached certificate as the merchandise coupon, a mark indicating that "the certificate was used" is recorded in the column of "status of use", by which it can be detected that the merchandise coupon is used twice. When an IC chip-attached merchandise coupon is used, it is necessary to check the status of the use in addition to the check of soundness. What information is to be recorded and checked in the "status of use" and what action is to be executed depend on the service contents and a policy of a facility of service 3902.

The configuration of a computer system installed in an agency for service center 3906 is basically the same as one of a computer system installed in the center to certify information about right of use shown in FIG. 36. In the store part for information about right of use 3608 information about right of use 4202 of a facility of service A and information about right of use 4214 of a facility of service B are stored. In the processing part 3608, processing of commands sent from a facility of service, a user and a facility to execute service using information in the store part for information about right of use 3608.

Figure 43:
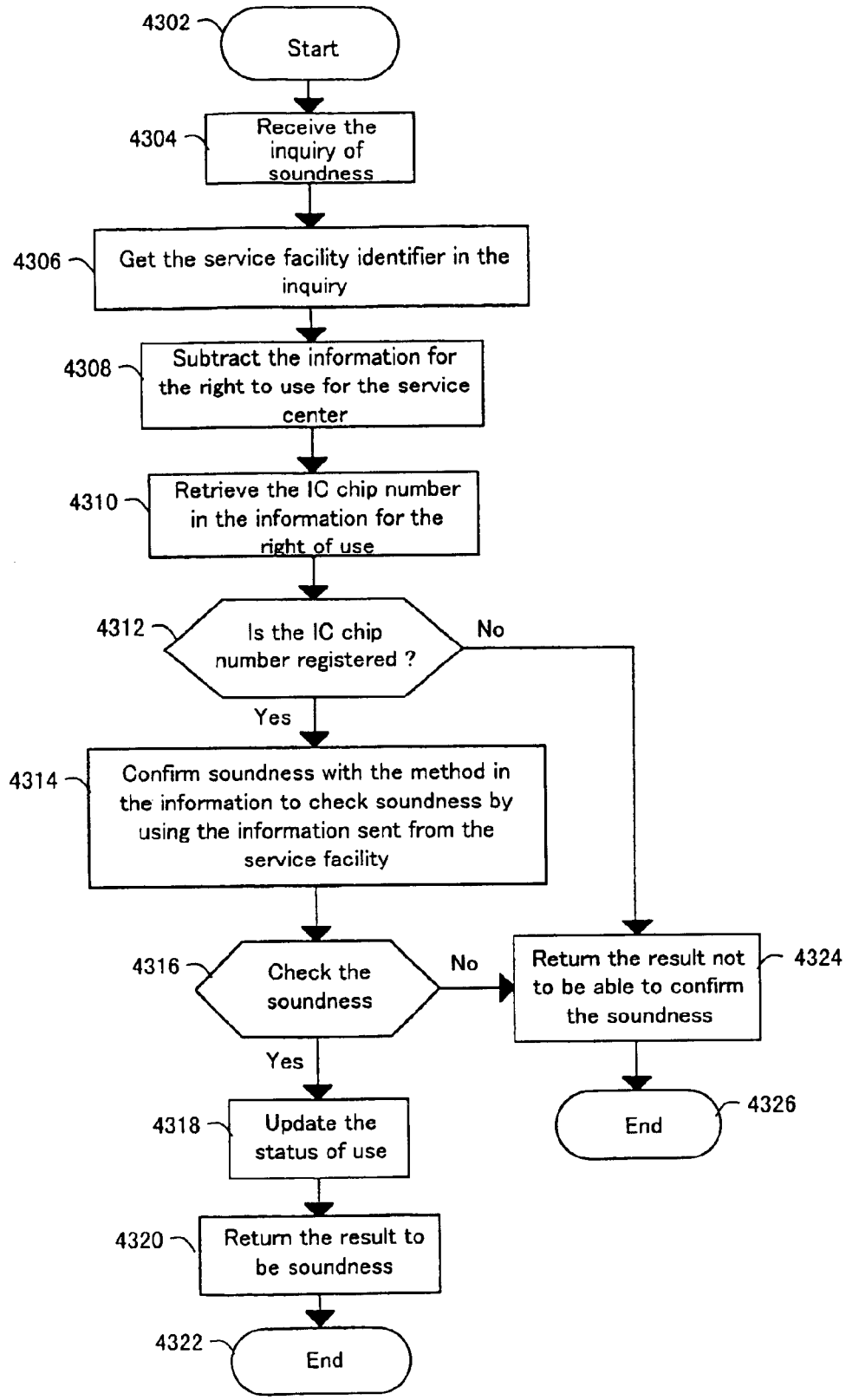
FIG. 43 is a flow chart of an embodiment of a processing procedure for the determination of soundness performed in an agency for service center.

The processing procedures for checking soundness performed in an agency for service center 3906 are almost the same as those in a center to certify information about right of use 3406. Here, an embodiment of the processing is explained with reference to FIG. 43. In the agency for service center 3906, upon receiving an inquiry about soundness from the facility to execute service 3928 (4304), the service facility identifier in the inquiry is retrieved from the inquiry information (4306). Then, corresponding information about right of use for a service facility is selected among information about right of use 4202 or 4214 for each service facility in the store part for information about right of use 3608 (4308). The selected information about right of use is searched for an IC chip number sent together with the check requirement (4310). When the IC chip is not registered, a result that "soundness is not certified" is returned (4324). When the IC chip is registered, the soundness is checked using the confirmation method described in the information to check soundness 4208 or 4220 and information used for the confirmation (4314). When the soundness is certified, the information about the status of use 4212 or 4224 is updated (4318), and a result that "it is sound" is returned to the facility to execute service 3928 (4320). When the soundness is not certified, a result that "the soundness is not certified" is returned to the facility to execute service 3928 (4324).

Figure 44:
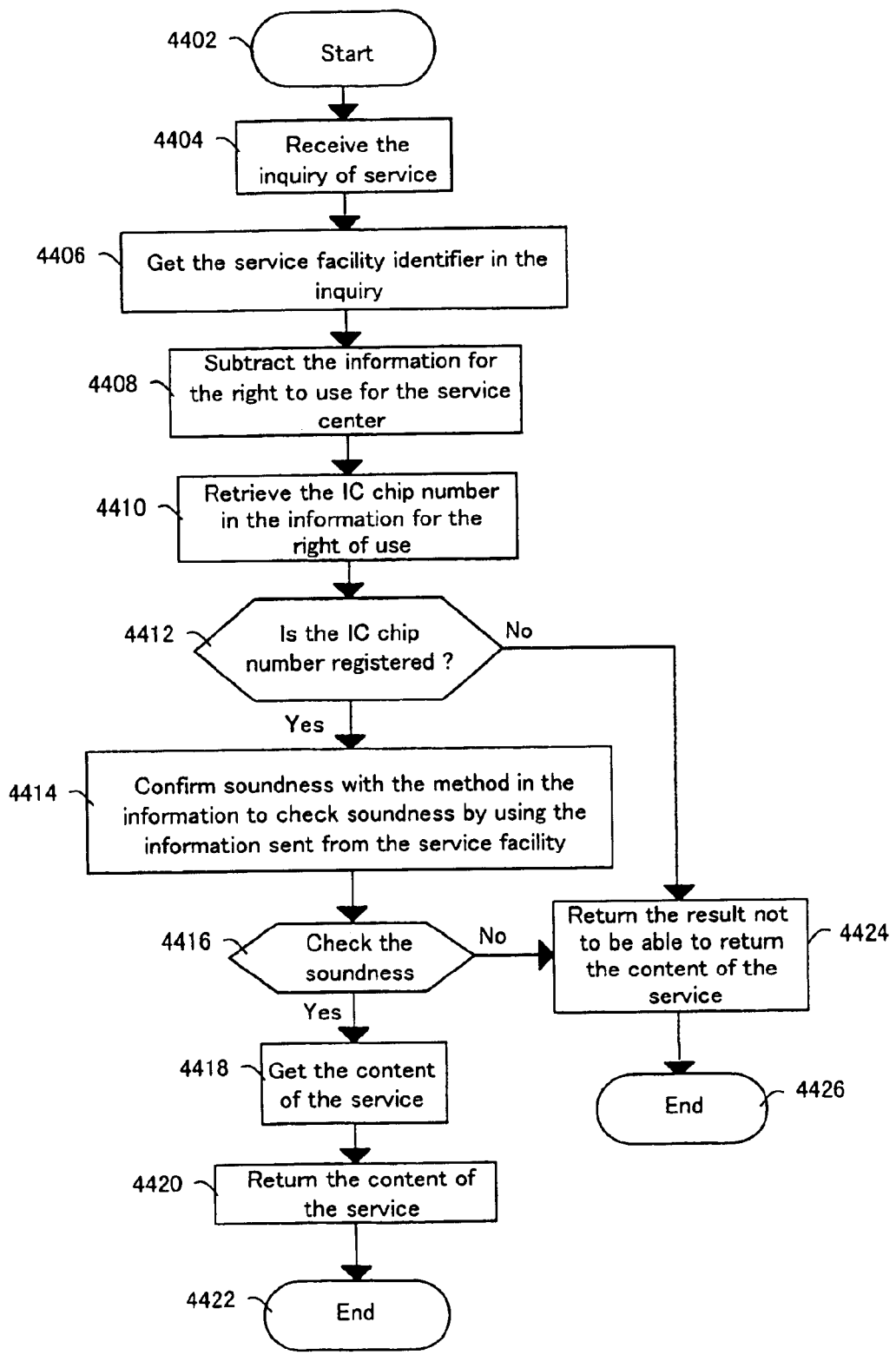
FIG. 44 is a flow chart of an embodiment of a processing procedure for dealing with an inquiry from a user, which is performed in an agency for service center.

An embodiment of a processing procedure for an inquiry (3914) from a user 3922 performed in an agency for service center 3906 is shown in FIG. 44. The procedure of the processing for an inquiry about a service from a user is also the same as one for an inquiry about the soundness shown in FIG. 43. Upon receiving an inquiry about a service from a user (4404), a service facility identifier in the inquiry is retrieved from the inquiry information (4406). Then, corresponding information about right of use for a service facility is selected among information about right of use 4202 or 4214 for each service facility in the store part for information about right of use 3608 (4408). The selected information about right of use is searched for an IC chip number which is sent together with the inquiry information (4410). When the IC chip is not registered, a result that "the content of service cannot be replied" is returned (4424). When the IC chip is registered, the soundness is checked using the confirmation method described in the information to check soundness 4208 or 4220 and the information used for the confirmation (4414). When the soundness is certified, the content of service 4210 or 4222 is retrieved (4418) and the content of service is returned to the user 3922 (4420). When the soundness is not certified, a result that "the content of service cannot be returned" is returned to the user 3922 (4424). There may be a case where the check of the soundness of the inquiry about the content of service is not necessary more precise than the check of the soundness of the execution of the service. What level of soundness check is to be performed may be determined depending on the content of the service.

When an agency for service center checks the soundness of an IC chip-attached seal or certificate using IC chip numbers of IC chips issued by a plurality of facilities of service, each IC chip number should be unique to each individual IC chip. If not, IC chips having the same IC chip number may be used, which may cause a confusion in the center for execute for facility of service with respect to the check of soundness and management. Such a confusion may be caused when a facility of service employs no agency for service center and checks the soundness by itself using an IC chip number. To solve this problem, it is necessary to manage the IC chip number so that it is unique to each individual IC chip. The IC chip which is managed so as to have a unique IC chip number is referred to as a "unique number-assigned IC chip". When the facility of service assigns the same IC chip number to IC chips issued by the facility of service as the service facility identifiers in place of using the unique number-assigned IC chips, a plurality of service facilities assign identifiers in their original manner, and therefore some IC chips may have the same IC chip number, which may cause a confusion in the check of soundness and management. From these reasons, a center is needed which manages IC chip numbers unique to individual IC chips or IC chip numbers which are different for individual service facilities and assigns the numbers to IC chips. Such a center is referred to as a "center to issue IC chip". The center may be a product manufacturer or an organization other than the product manufacturer.

Figure 45:
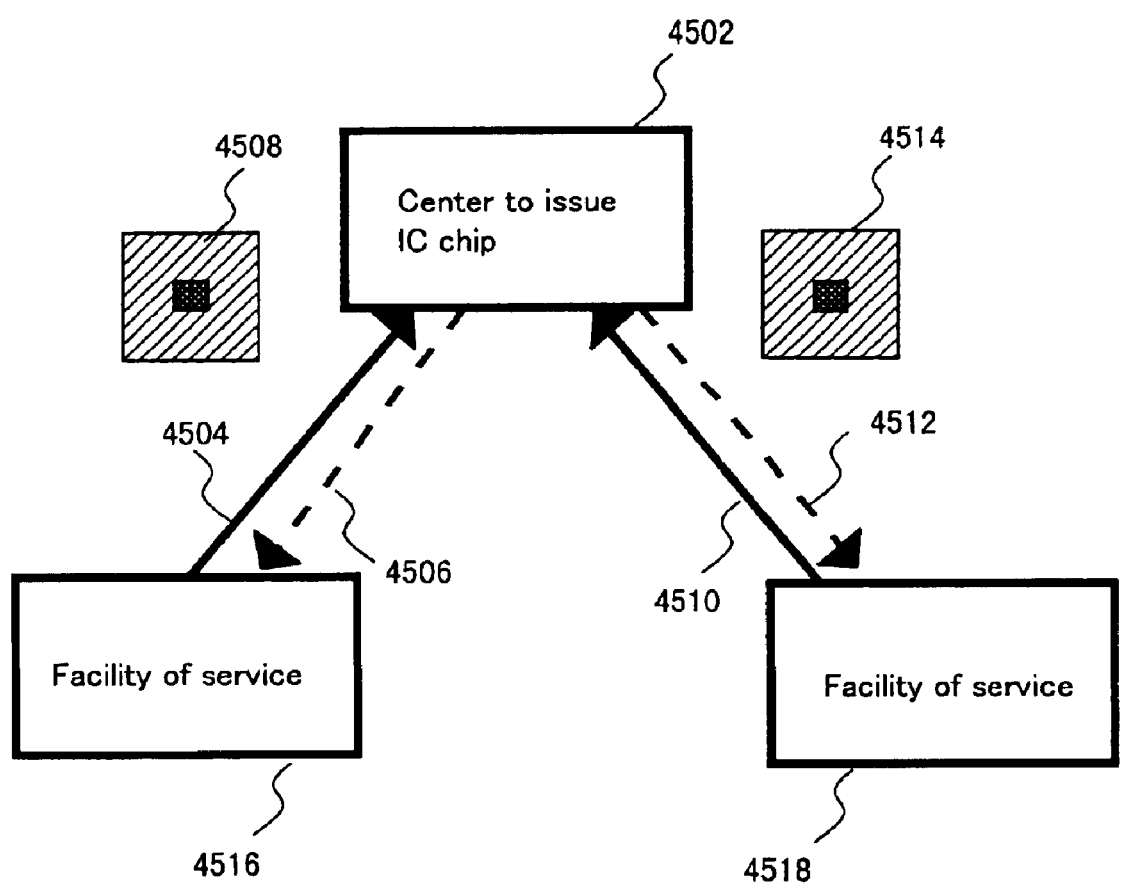
FIG. 45 shows an embodiment of a system comprising a center to issue IC chip and facilities of service.

An embodiment of the relation between a center to issue IC chip and a facility of service is shown in FIG. 45. The center to issue IC chip 4502 distributes an IC chip-attached tag or seal 4508 or 4514 in which an IC chip is integrated (4506, 4512) in accordance with a demand of each service facility 4516 or 4518 (4504, 4510). The IC chip is assigned with a unique IC chip number in the center to issue IC chip and then distributed.

As the method for assigning a unique IC chip number, there are mentioned the following ones.

(1) A method in which an IC chip is assigned with an IC chip number comprising the combination of an article number [JAN (Japan Article Number) of Japan] given to a facility of service and a sequential number for each IC chip.

(2) A method in an IC chip is assigned with a sequential or unique number and distributed to a facility of service if required.

In the method of item (1), since an article number is used, a facility of service to which the IC chip belongs can be determined by reading the article number. In the method of item (2), although there is an advantage that assigning of an IC chip can be achieved without the use of a JAN code, the facility of service must manage such random IC chip numbers. For distinguishing IC chips for every facility of service, it may be useful to utilize an article number or the like.

Figure 46:
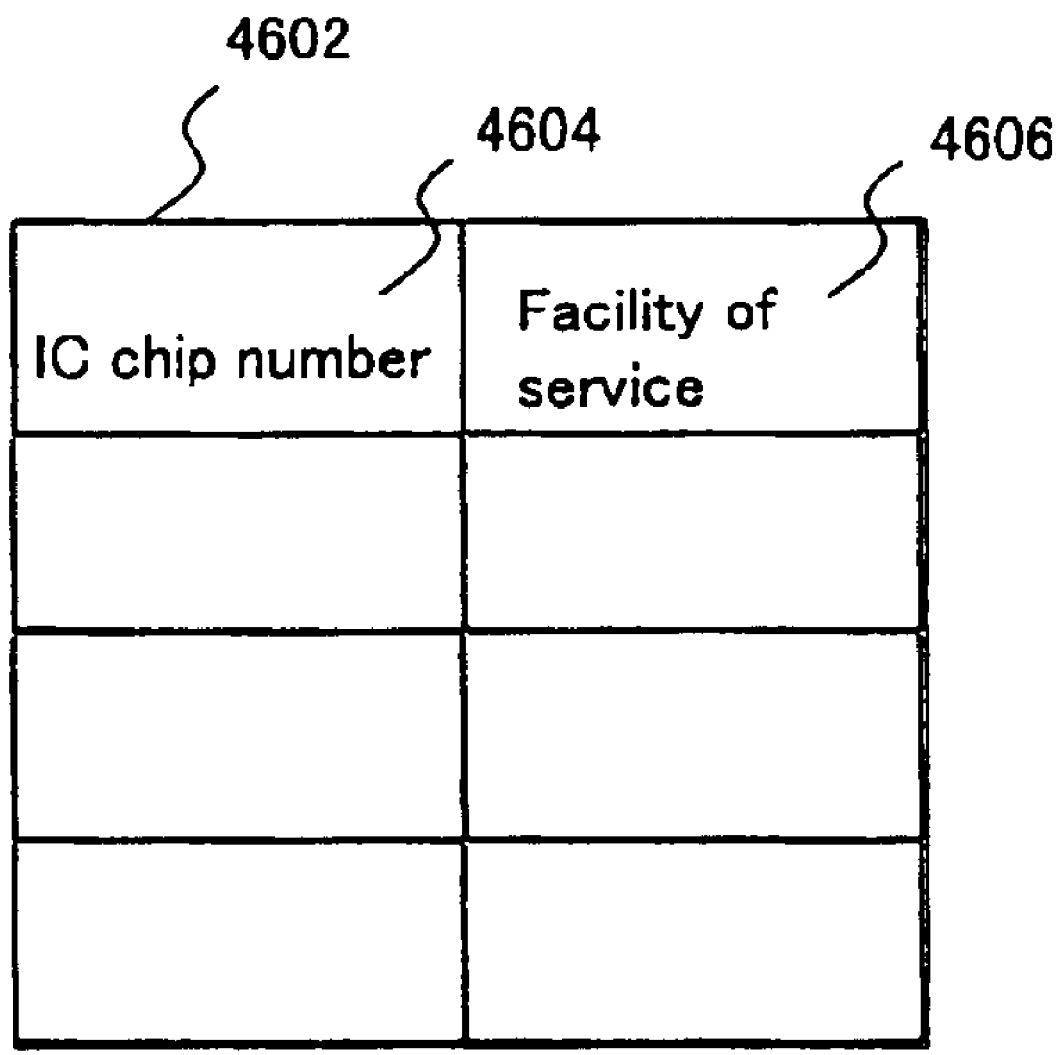
FIG. 46 shows a correspondence table between the IC chip number managed by a center to issue IC chip and a facility of service.

FIG. 46 shows an example of a correspondence table between an IC chip number and a facility of service, which is managed for the assignment of a unique IC chip number by the center to issue IC chip 4502. In both the methods of item (1) and (2) above, the format of a table 4602 managed by the center to issue IC chip 4502 is usually as shown in FIG. 46. In the method of item (1), an IC chip assigned with an article number as the IC chip number 4604 in the table 4602 is used by a facility of service 4606 which utilizes the article number. In this case, although there are a plurality of IC chips all having the same IC chip number, the IC chips are assigned to one facility of service. In contrast, in the method of item (2), each of the individual IC chips has a unique IC chip number 4604, and assigned to any facility of service 4606.

Figure 47:
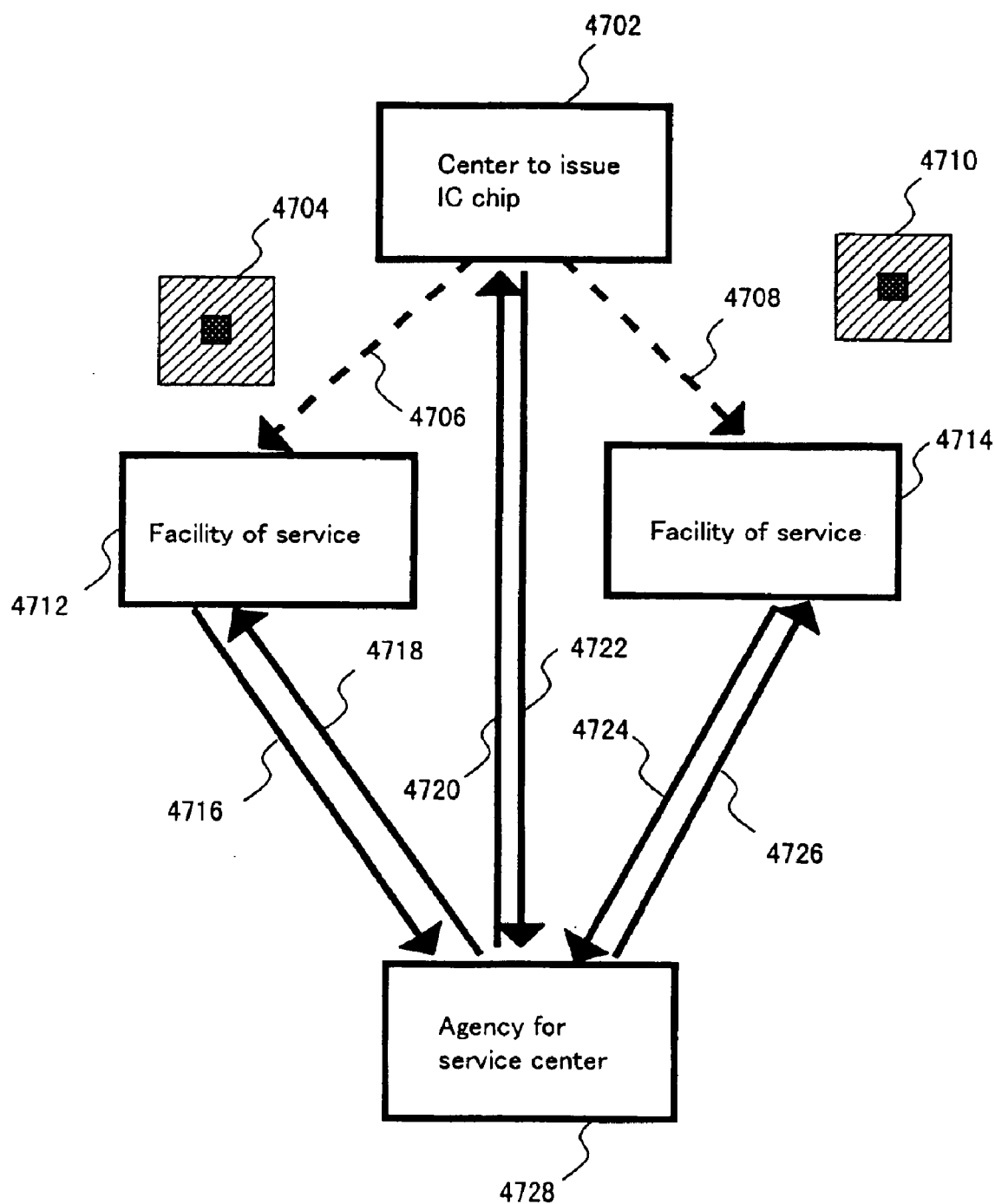
FIG. 47 shows an embodiment of a system comprising a center to issue IC chip, a facility of service and an agency for service center.

FIG. 47 shows an embodiment of the relation among a center to issue IC chip, a facility of service and an agency for service center in the case where an agency for service center is intervened. When any suspicious IC chip number is found, the agency for service center 4728 makes an inquiry about an IC chip number to a center to issue IC chip 4702 (4720) and can know the result (4722). For example, if a given IC chip number is not one assigned by the center to issue IC chip 4702, it is found that the IC chip is suspected of being counterfeited. Since the counterfeiting of an IC chip cannot be achieved without the use of a semiconductor factory, the counterfeiting is extremely difficult compared to a counterfeiting using printing technology. However, if a counterfeiter can use a semiconductor factory for some reasons, then the counterfeiting of an IC chip cannot be said to be completely impossible. However, by intervening a center to issue IC chip 4702, it becomes possible to find of or take countermeasures against the counterfeiting readily, because the center 4702 can manage the IC chip numbers collectively.

According to the embodiments of the present invention, by attaching an IC chip to a certificate, the soundness of the certificate can not only be checked by printing technology but also using the IC chip. As a result, the counterfeiting of the certificate is made difficult, and the reliability of a service system executed by a facility of service or a facility to execute service can be improved. In addition, when such a small IC chip-attached seal is brought by a user in place of a certificate, the user can bring certificates more frequently and therefore can obtain the services when necessary, which is more convenient for the user. The facility to execute service can make an inquiry about the soundness of the IC chip-attached seal or certificate to a center to certify information about right of use which is provided in the facility of service certificate every time the user obtains the service from the facility to execute service, whereby the reliability of the certification of soundness can be improved. When an agency for service center which executes for the center to certify information about right of use is intervened, the need to check the soundness of the IC chip-attached seal or certificate by the facility of service can be eliminated.

Hereinbelow, other embodiments of the present invention will be described.

(1) A method for the determination of soundness of a sheet-shaped medium having an IC chip which is attached on or put in the medium and which is constructed so that data stored in a memory of the IC chip can be sent in a radio mode by radio communication between the IC chip and a communication device or means, at least a portion of the date stored in the memory of the IC chip being at least one selected from first information about a facility of service which provides a first service which an owner of the medium can obtain by using the medium, second information which is personal information of the owner and third information which is unique to the IC chip and can be used for distinguishment of the IC chip from other IC chips;

the information of a plurality of IC chips being manageable by storing at least one of the first, second and third information and a related information obtained using the information as a key in a memory;

the method comprises: receiving at least one of the first, second and third information in the IC chip; reading the related information from the memory using the at least one information as a key; and determining the soundness of the medium or a proof item or items of the medium based on the received information and the read information.

(2) A method for the verification of data of a sheet-shaped medium having an IC chip which is attached on or put in the medium and which is constructed so that data stored in a memory of the IC chip can be sent in a radio mode by radio communication between the IC chip and a communication device or means, at least a portion of the date stored in the memory of the IC chip being at least one selected from first information about a facility of service which provides a first service which an owner of the medium can obtain by using the medium, second information which is personal information of the owner and third information which is unique to the IC chip and can be used for distinguishment of the IC chip from other IC chips;

when the owner of the IC chip has the right to obtain the first service, at least one of the first, second and third information of the IC chip is stored in the memory as a data set about the owner;

the method comprising: receiving at least one of the first, second and third information in the IC chip; and verifying the received date against the date set. (3) A method for the verification of data of a sheet-shaped medium having an IC chip which is attached on or put in the medium and which is constructed so that data stored in a memory of the IC chip can be sent in a radio mode by radio communication between the IC chip and a communication device or means, at least a portion of the date stored in the memory of the IC chip being identification data provided to the IC chip;

when the right of obtaining a service by using the medium is granted to an owner of the medium, the identification data of the IC chip of the medium being stored in the memory as a data set about the owner;

the method comprising: receiving the identification data in the IC chip; and verifying the received date against the date set to determine whether the owner has the right of obtaining the service.

(4) A method for the verification of data of a sheet-shaped medium having an IC chip which is attached on or put in the medium and which is constructed so that data stored in a memory of the IC chip can be sent in a radio mode by radio communication between the IC chip and a communication device or means, at least a portion of the date stored in the memory of the IC chip being identification data provided to the IC chip;

when an owner of the medium has the right of obtaining a service, the identification data of the IC chip of the medium is stored in the memory as a data set about the owner, and at least one item selected from the term for which the owner can obtain the service, the number of times the owner can obtain the service and the remaining number of times the owner can obtain the service is stored using the identification data as a key in the memory as a data set wherein the data set is constructed so as to be updated successively;

the method comprising: receiving the identification data in the IC chip of the medium; and verifying the received date against the date set to determine whether the owner has the right of obtaining the service.

(5) A method for the verification of data of a sheet-shaped medium having an IC chip which is attached on or put in the medium and which is constructed so that data stored in a memory of the IC chip can be sent in a radio mode by radio communication between the IC chip and a communication device or means, at least a portion of the date stored in the memory of the IC chip being unique data which can be used for the distinguishment of the IC chip from other IC chips;

for as long as the medium is circulated in marketplace and a flagging function for receiving a particular service is provided to the owner of the medium, the unique data of the IC chip of the medium or data obtained using the unique data as a key is stored in the memory as a data set about the owner to whom the flagging function is provided;

the method comprising: receiving the unique data in the IC chip of the medium; and verifying the received date against the date set to determine whether the owner has the right of obtaining the service.

(6) The method according to any one of the items (2) to (5), wherein the sheet-shaped medium comprises one member selected from the group consisting of a paper, a plastic and a film with a peel-off sticker.

(7) The method according to any one of the items (2) to (5), wherein the sheet-shaped medium is intended to be used as a life insurance certificate, a non-life insurance certificate, a health insurance certificate, a merchandise coupon, a share certificate, a paper money, a ticket or a passenger ticket.

(8) A service system for issuing a sheet-shaped medium which has, as means for certifying the right of obtaining a service from a facility to execute service, an IC chip attached thereto in which unique identification information is stored; and storing information about right of use of the service in a server in relation to information of the issued IC chip; when receiving an inquiry based on the identification information of the IC chip from a terminal of the facility to execute service, generating a reply to the inquiry based on the identification information of the IC chip registered in the server or information about right of use of service which is registered in the server in relation to the identification information; and sending the reply to a terminal of the facility to execute service.

Here, the information about the right of use of a service may include user information, information to check soundness, content of service, status of use and term of validity.

(9) A service system comprising a facility of service which issues a sheet-shaped medium which has, as means for certifying the right to obtain a service from a facility to execute service, an IC chip attached thereto in which unique identification information is stored; and information center which is connected to the facility of service via a communication line;

the information center storing information about right of use of the service in a server in relation to information of the issued IC chip; when receiving an inquiry based on the identification information of the IC chip from a terminal of the facility to execute service, generating a reply to the inquiry based on the identification information of the IC chip registered in the server or information about right of use of service which is registered in the server in relation to the identification information; and sending the reply to a terminal of the facility to execute service.

In each of the service systems, the server may be configured so as to store the information to check soundness, to generate the reply to the inquiry based on the information, and to send the reply to the terminal of the facility to execute service.

Another embodiment of the information processing system according to the present invention is a system for receiving an inquiry about an IC chip used for certification and sending a reply to the inquiry, the system comprising: a sending/receiving unit which receives the inquiry about the IC chip and sending the processed result; a memory unit for information of the IC chip in which information accompanied with identification information of the IC chip obtained by using the identification as a key is stored in a tabular form; and a processing unit which searches the information in the memory unit for information of the IC chip to generate the result to the inquiry. The inquiry may be made by a facility to execute service which provides a service in response to the presentation of an IC chip-attached sheet-shaped medium or certificate, or by a user. The inquiry from the facility to execute service may usually be an inquiry about the soundness of the IC chip or IC chip-attached certificate presented by the user. The inquiry from the user may be an inquiry about the content of the service to be received. In the system, it may be possible that information about the method for determination of soundness of the IC chip is stored in the memory unit for information of the IC chip, the processing unit processes the inquiry information received in the sending/receiving unit according to the method for determination of soundness of the inquiry information, and the processing result is sent from the sending/receiving unit to the inquirer.

Still another embodiment of the service system according to the present invention comprises a facility of service which manages a service;

the facility of service issuing a sheet-shaped medium which has, as means for certifying the right of obtaining a service from a facility to execute service, an IC chip attached thereto in which unique identification information is stored, and storing information about the right of use of the service in a server in relation to the identification number of the issued IC chip;

when receiving an inquiry about the content of the service from a user terminal based on the identification information of the IC chip, the server generating an reply to the inquiry based on the information about the right of use of the service which is registered in relation to the identification information and sending the reply to the user terminal.

Further still another embodiment of the service system according to the present invention comprises an information center which is connected to a facility of service which manages a service through a communication line;

the information center receiving data of information about the right of use of the service which is modified in a tabular form in relation to the identification number of the issued IC chip from a facility of service which issues a sheet-shaped medium which has, as means for certifying the right to obtain a service from a facility to execute service, an IC chip attached thereto in which unique identification information is stored, and storing information about the right of use of the service in a server;

when receiving an inquiry about the content of the service from a user terminal based on the identification information of the IC chip, the server generating a reply to the inquiry based on the information about the right of use of the service which is registered in relation to the identification information and sending the reply to the user terminal.

An embodiment of the interrogator according to the present invention comprises; a communication processing unit which executes the radio communication; an IC chip reading unit which reads information in an IC chip which is used for certification in a contactless manner; a display unit which displays the content read by the IC chip reading unit; and switch which selects the functions of the communication processing unit and the IC chip reading unit.

Another embodiment of the interrogator according to the present invention comprises; a communication processing unit which execute the radio communication; an IC chip reading unit which reads information in an IC chip which is used for certification in a contactless manner; a memory unit for information of IC chip which stores therein the data read by the IC chip reading unit; a display unit which displays the content read by the IC chip reading unit; and switch which selects the functions of the communication processing unit and the IC chip reading unit; and the interrogator having a function to sent the data stored in the memory unit for information of IC chip during the communication processing in the communication processing unit being executed.

The interrogator may further comprise a scanner which reads information such as a character or bar code printed on the certificate. The interrogator may further comprise a soundness-determination processing unit which makes a comparison between the information in the IC chip and the print information read by the scanner to determine the soundness of the certificate.

According to the present invention, for example, a certificate with high security can be provided.

The patent application cited herein is incorporated herein by reference in its entirety.

The invention has been described in detail with reference to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A service system comprising:

an interrogator; and a computer system, wherein the interrogator and the computer system are interconnected via at least one of a leased circuit, a public circuit and an Internet;

the interrogator reads first information and a digital signature printed on the surface of a certificate which comprises an electronic tag by a character reading part of the interrogator, receives a second information stored in the electronic tag by an antenna part of the interrogator, and sends the first information and second information and digital signature to the computer system;

the computer system calculates a third information from the first information and the digital signature using RSA public key encription and certifies the certificate by comparing the second information with the third information.

2. The service system according to claim 1;
wherein the digital signature is calculated from a linkage of the first information and the second information.

3. The service system according to claim 1;
wherein the digital signature is calculated from a sum of the first information and the second information.

4. The service system according to claim 1;
wherein the digital signature is generated from a third information to the power of a fourth information modulo a fifth information for a secret key;
the third information comprises the first information and the second information; and
the secret key comprises the fourth information and the fifth information.

5. The service system according to claim 1;
wherein the third information is the difference between the digital signature to the power of a fifth information modulo a sixth information for a public key and the first information; and
the public key comprises the fifth information and the sixth information.

6. The interrogator according to claim 1;
wherein the certificate is used as a life insurance certificate, non-life insurance certificate, a health insurance certificate, a merchandise coupon, a share certificate, a paper money, a ticket or a passenger ticket.

7. An interrogator which reads a first information and a digital signature printed on the surface of a certificate which comprises an electronic tag by a character reading part of the interrogator, receives a second information stored in the electronic tag by an antenna part of the interrogator, calculates a third information from the first information and the digital signature using RSA public key encription, and certifies the certificate by comparing the second information with the third information.

8. The interrogator according to claim 7;
wherein the digital signature is calculated from a sum of the first information and the second information using RSA.

9. The interrogator according to claim 7;
wherein the digital signature is calculated from a linkage of the first information and the second information using RSA.

10. The interrogator according to claim 7;
wherein the digital signature is generated from a third information to the power of a fourth information modulo a fifth information for a secret key;
the third information comprises the first information and the second information; and
the secret key comprises the fourth information and the fifth information.

11. The interrogator according to claim 7;
wherein the third information is the difference between the digital signature to the power of a fifth information modulo a sixth information for a public key and the first information; and
the public key comprises the fifth information and the sixth information.

12. The interrogator according to claim 7;
wherein the certificate is used as a life insurance certificate, non-life insurance certificate, a health insurance certificate, a merchandise coupon, a share certificate, a paper money, a ticket or a passenger ticket.

* * * * *